(12) United States Patent
Park et al.

(10) Patent No.: US 10,685,465 B2
(45) Date of Patent: Jun. 16, 2020

(54) ELECTRONIC DEVICE AND METHOD FOR DISPLAYING AND GENERATING PANORAMIC IMAGE

(71) Applicant: SAMSUNG ELECTRONICS CO., LTD., Suwon-si, Gyeonggi-do (KR)

(72) Inventors: Ji-Hun Park, Incheon (KR); Tai-Geun Kang, Seoul (KR); Ji-Hie Kim, Seoul (KR); Dug-In Lyu, Seoul (KR); Jong-Deok Choi, Seongnam-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/361,198

(22) Filed: Nov. 25, 2016

(65) Prior Publication Data

US 2017/0154455 A1 Jun. 1, 2017

(30) Foreign Application Priority Data

Nov. 27, 2015 (KR) .......................... 10-2015-0167986
Oct. 31, 2016 (KR) .......................... 10-2016-0143159

(51) Int. Cl.
*G06T 11/60* (2006.01)
*G06T 19/00* (2011.01)
(Continued)

(52) U.S. Cl.
CPC ............ *G06T 11/60* (2013.01); *G06T 19/006* (2013.01); *H04N 13/156* (2018.05);
(Continued)

(58) Field of Classification Search
CPC ..... G06T 11/60; G06T 19/006; H04N 13/332; H04N 13/344; H04N 13/366; H04N 2013/0088
See application file for complete search history.

(56) References Cited

U.S. PATENT DOCUMENTS 5,714,997 A  2/1998 Anderson
6,317,127 B1* 11/2001 Daily ...................... G06T 15/10
                                                            345/629

(Continued)

FOREIGN PATENT DOCUMENTS

CN       1965578 A       5/2007
JP       2013-027021     2/2013

(Continued)

OTHER PUBLICATIONS

Abstract for "Trend of International Standardization for Super Multi-View Video", published Aug. 20, 2015, 1 page.

(Continued)

*Primary Examiner* — Sing-Wai Wu
(74) *Attorney, Agent, or Firm* — Nixon & Vanderhye P.C.

(57) ABSTRACT

Disclosed is a method for displaying a panoramic image by an electronic device. According to an example embodiment of the present disclosure, a method for generating a panoramic image may comprise sensing a direction that a first side surface of the electronic device faces through a sensor included in the electronic device, displaying a first partial image of the panoramic image corresponding to the sensed direction of the first side surface, determining a direction corresponding to the reference view information with respect to the first partial image if information regarding the first partial image differs from reference view information indicating a reference view for the panoramic image, and providing information about the determined direction.

20 Claims, 34 Drawing Sheets

(51) Int. Cl.
*H04N 13/00* (2018.01)
*H04N 13/156* (2018.01)
*H04N 13/183* (2018.01)
*H04N 13/332* (2018.01)
*H04N 13/243* (2018.01)
*H04N 13/344* (2018.01)
*H04N 13/178* (2018.01)
*H04N 13/366* (2018.01)
*H04N 13/398* (2018.01)
*H04N 13/106* (2018.01)

(52) U.S. Cl.
CPC ......... *H04N 13/158* (2018.05); *H04N 13/178* (2018.05); *H04N 13/183* (2018.05); *H04N 13/243* (2018.05); *H04N 13/332* (2018.05); *H04N 13/344* (2018.05); *H04N 13/366* (2018.05); *H04N 13/398* (2018.05); *H04N 2013/0088* (2013.01)

(56) References Cited

U.S. PATENT DOCUMENTS

| | | |
|---|---|---|
| 2002/0090143 A1 | 7/2002 | Endo et al. |
| 2003/0065446 A1 | 4/2003 | Ootomo et al. |
| 2004/0246333 A1 | 12/2004 | Steuart, III |
| 2007/0200926 A1* | 8/2007 | Chianglin ............... G03B 37/02 348/36 |
| 2007/0243863 A1* | 10/2007 | Hong ................... G02B 27/017 455/418 |
| 2008/0298674 A1 | 12/2008 | Baker et al. |
| 2011/0141141 A1 | 6/2011 | Kankainen |
| 2012/0075343 A1* | 3/2012 | Chen ..................... G09G 5/397 345/633 |
| 2012/0105682 A1 | 5/2012 | Hata et al. |
| 2013/0018881 A1* | 1/2013 | Bhatt .................. G06F 3/04842 707/736 |
| 2013/0033566 A1 | 2/2013 | Sento |
| 2013/0044130 A1 | 2/2013 | Geisner et al. |
| 2013/0124204 A1 | 5/2013 | Wong et al. |
| 2014/0022242 A1 | 1/2014 | Wenzel et al. |
| 2014/0153896 A1* | 6/2014 | Takahashi ............... G06F 3/147 386/230 |
| 2014/0300688 A1 | 10/2014 | Shin |
| 2014/0354683 A1* | 12/2014 | Suzuki .................. G06T 3/4038 345/632 |
| 2014/0375683 A1 | 12/2014 | Salter et al. |
| 2015/0055937 A1* | 2/2015 | Van Hoff ........... H04N 13/0014 386/285 |
| 2015/0062161 A1 | 3/2015 | Kim et al. |
| 2015/0128292 A1 | 5/2015 | Malecki et al. |
| 2015/0309310 A1* | 10/2015 | Cho ..................... G02B 27/017 348/158 |
| 2015/0341617 A1 | 11/2015 | Cole et al. |

FOREIGN PATENT DOCUMENTS

| | | |
|---|---|---|
| KR | 10-2015-0050825 | 5/2015 |
| KR | 10-2015-0078242 | 7/2015 |
| KR | 10-2015-0122355 | 11/2015 |

OTHER PUBLICATIONS

Abstract for "Technical Report for High Quality Panorama Video", published Dec. 2014, 4 pages.
Search Report and Written Opinion dated Feb. 20, 2017 in counterpart International Patent Application No. PCT/KR2016/013656.
Extended European Search Report for EP Application No. 16868915.6 dated Jun. 26, 2018.
Chinese Office Action dated Sep. 25, 2019 for Chinese Application No. 2016800686969.
European Office Action dated Feb. 20, 2020 for EP Application No. 16868915.6.

* cited by examiner

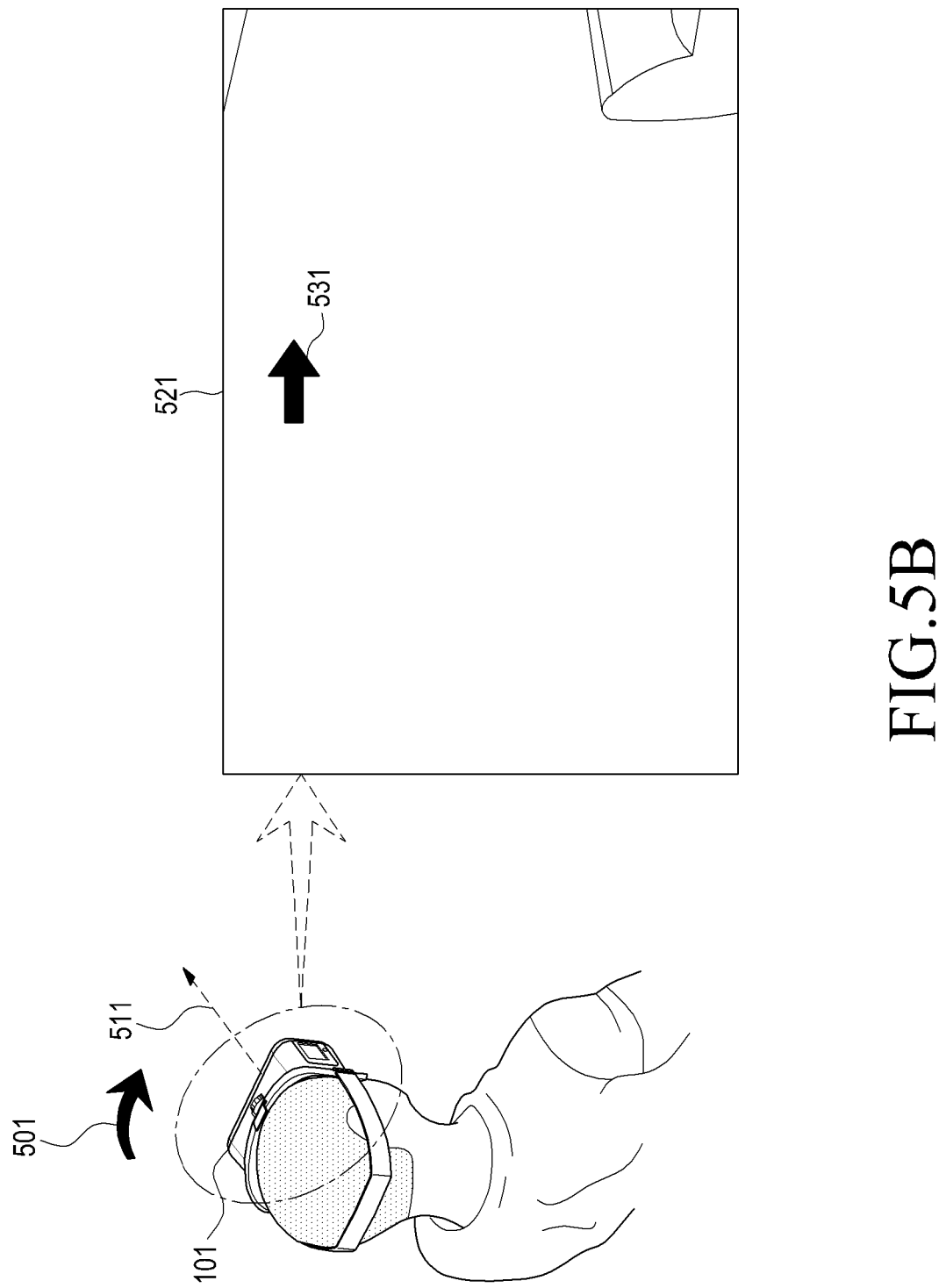

ELECTRONIC DEVICE AND METHOD FOR DISPLAYING AND GENERATING PANORAMIC IMAGE

CROSS-REFERENCE TO RELATED APPLICATIONS

This application is based on and claims priority under 35 U.S.C. § 119 to a Korean patent application filed in the Korean Intellectual Property Office on Nov. 27, 2015 and assigned Serial No. 10-2015-0167986, and to a Korean patent application filed in the Korean Intellectual Property Office on Oct. 31, 2016 and assigned Serial No. 10-2016-0143159, the disclosures of which are incorporated by reference herein in their entireties.

TECHNICAL FIELD

The present disclosure relates generally to electronic devices and methods for displaying and generating panoramic images, and for example, to electronic devices and methods for displaying and generating panoramic images containing view information.

DISCUSSION OF RELATED ART

Generally, virtual reality (VR) refers to an environment or circumstance similar to a real-life environment as created by computer graphics and may refer, for example, to an interface allowing a human being to feel it through his sense organ as if he interacts with it. The user may interoperate with virtual reality in real-time through device manipulation and may have a similar sensory experience to that in the real world.

Augmented reality (AR) is part of virtual reality and is a computer graphic scheme that allows a virtual object to look present in the original environment by synthesizing the virtual object or information with the actual environment. Augmented reality (AR) is a technique showing the user an overlap of the virtual object on the real-life world the user sees with his eyes. It shows a single image obtained by mixing additional information and virtual world with the real world in real-time, and thus, it is also called mixed reality (MR).

Such virtual reality techniques may be easily or frequently encountered in various services, such as education, games, navigation, advertisements, or blog services through electronic devices supportive of the virtual reality services. For example, an electronic device may split one screen in left and right directions and may display images corresponding to the user's left and right eyes to the split screens, respectively. Recently, head mounted theater (HMT) apparatuses are being developed that may be integrated with displays to present images displayed on their respective corresponding split screens through the user's overall view. As images corresponding to the user's eyes are provided through the overall view, the user may receive virtual reality services.

The above information is presented as background information to assist with an understanding of the present disclosure.

SUMMARY

An electronic device provides a panoramic image representing an overall three-dimensional (3D) space to provide a virtual reality (VR) service. Since the panoramic image for providing a VR service represents the overall 3D space, the user may view the panoramic image using his electronic device while freely moving in a desired direction. Meanwhile, since the panoramic image represents the overall 3D space, the user may suffer from an inconvenience when he himself discovers a direction in which an image of a particular portion of the panoramic image is provided to view the particular portion of the image.

According to various example embodiments of the present disclosure, an electronic device and a method for generating and displaying a panoramic image to address the foregoing or other problems are provided.

According to an example embodiment of the present disclosure, an electronic device may comprise a sensor configured to sense a direction that a first side surface of the electronic device faces, a display configured to display a partial image of a panoramic image, and a processor configured to display, on the display, a first partial image of the panoramic image corresponding to the direction of the first side surface sensed through the sensor, to determine a direction corresponding to the reference view information with respect to the first partial image if information regarding the first partial image differs from reference view information indicating a reference view for the panoramic image, and to provide information about the determined direction.

According to an example embodiment of the present disclosure, a method for displaying a panoramic image by an electronic device may comprise sensing a direction that a first side surface of the electronic device faces through a sensor included in the electronic device, displaying a first partial image of the panoramic image corresponding to the sensed direction of the first side surface, determining a direction corresponding to the reference view information with respect to the first partial image if information regarding the first partial image differs from reference view information indicating a reference view for the panoramic image, and providing information about the determined direction.

According to an example embodiment of the present disclosure, an electronic device may comprise a plurality of image capturing modules comprising image capturing circuitry spaced apart from each other to have different optical axis directions and a processor configured to obtain a plurality of images through the plurality of image capturing modules, to generate reference view information indicating a reference view for a panoramic image generated using the plurality of images, and to insert the reference view information into information related to the panoramic image.

According to an example embodiment of the present disclosure, a method for generating a panoramic image by an electronic device may comprise obtaining a plurality of images from a plurality of image capturing modules comprising image capturing circuitry included in the electronic device and spaced apart from each other to have different optical axis directions, generating reference view information indicating a reference view for the panoramic image generated using the plurality of images, and inserting the reference view information into information related to the panoramic image.

According to an example embodiment of the present disclosure, in a non-transitory computer-readable recording medium, retaining a program to be executed on a computer, the program may comprise commands which, when executed by a processor, cause the processor to perform operations comprising: displaying a first partial image of a panoramic image corresponding to a direction that a first side surface of an electronic device faces sensed through a sensor included in the electronic device, if information regarding the first partial image differs from reference view information indicating a reference view for the panoramic image, determining a direction corresponding to the reference view information with respect to the first partial image, and providing information about the determined direction.

According to an example embodiment of the present disclosure, in a non-transitory computer-readable recording medium retaining a program executed on a computer, the program may comprise commands which, when executed by a processor, cause the processor to perform operations comprising: generating reference view information indicating a reference view for a panoramic image generated using a plurality of images obtained from a plurality of image capturing modules and inserting the reference view information into information related to the panoramic image.

According to an example embodiment of the present disclosure, an electronic device and a method for generating and displaying a panoramic image containing reference view information indicating a reference view for the panoramic image are provided. Accordingly, the user may efficiently notice a direction in which an image of a particular portion of the panoramic image is provided in order to view the particular portion image.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

A more complete understanding of the present disclosure and many of the attendant aspects and advantages thereof will become more readily understood from the following detailed description, taken in conjunction with the accompanying drawings, in which like reference numerals refer to like elements, and wherein:

FIGS. 5B, 5C, 5D and 5E are diagrams illustrating an example of varying a partial image of a panoramic image displayed on an electronic device according to an example embodiment of the present disclosure;

FIGS. 10A, 10B and 10C-1, 10C-2, 10C-3, 10C-4 and 10C-5 are diagrams illustrating an electronic device according to an example embodiment of the present disclosure;

FIGS. 13A, 13B-1, 13B-2 and 13C are diagrams illustrating an example method for generating reference view information according to an example embodiment of the present disclosure;

Throughout the drawings, like reference numerals will be understood to refer to like parts, components, and structures.

DETAILED DESCRIPTION

Figure 1:
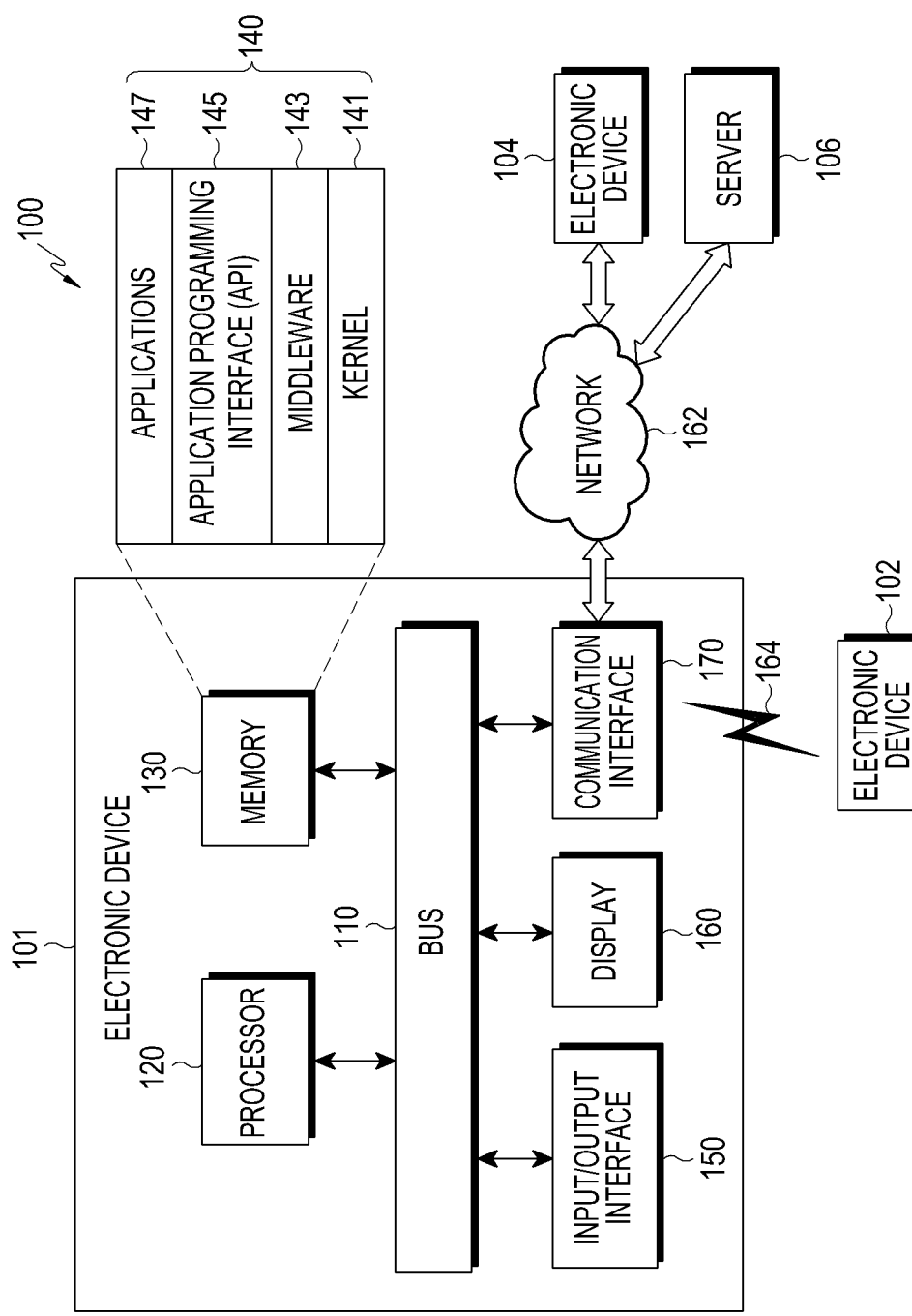
FIG. 1 is a diagram illustrating an example network environment including an electronic device according to an example embodiment of the present disclosure.

Hereinafter, various example embodiments of the present disclosure are described with reference to the accompanying drawings. However, it should be appreciated that the present disclosure is not limited to the example embodiments, and all changes and/or equivalents or replacements thereto also fall within the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. On the other hand, it will be understood that when an element (e.g., a first element) is referred to as being "directly coupled with/to" or "directly connected with/to" another element (e.g., a second element), no other element (e.g., a third element) is interposed between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not necessarily mean "specifically designed in hardware to." Rather, the term "configured to" may refer, for example, to a situation in which a device can perform an operation together with another device or parts. For example, the term "processor configured (or set) to perform A, B, and C" may refer, for example, to a a generic-purpose processor (e.g., a CPU or application processor) that may perform the operations by executing one or more software programs stored in a memory device or a dedicated processor (e.g., an embedded processor) for performing the operations.

The terms as used herein are provided simply to describe various example embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the example embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For example, examples of the electronic device according to various example embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a mobile medical device, a camera, or a wearable device, or the like, but is not limited thereto. According to an example embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit), or the like, but is not limited thereto.

According to an example embodiment of the present disclosure, the electronic device may be a home appliance. Examples of the home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™ PlayStation™), an electronic dictionary, an electronic key, a camcorder, or an electronic picture frame, or the like, but is not limited thereto.

According to an example embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler), or the like, but is not limited thereto.

According to various example embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves), or the like, but is not limited thereto. According to an example embodiment of the present disclosure, the electronic device may be one or a combination of the above-listed devices. According to an example embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various example embodiments of the present disclosure. As used herein, the term "user" may denote a human or another device (e.g., an artificial intelligent electronic device) using the electronic device.

Referring to FIG. 1, according to an example embodiment of the present disclosure, an electronic device 101 is included in a network environment 100. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some example embodiments, the electronic device 101 may exclude at least one of the components or may add another component.

The bus 110 may include a circuit for connecting the components 110 to 170 with one another and transferring communications (e.g., control messages and/or data) between the components.

The processor 120 may include various processing circuitry, such as, for example, and without limitation, one or more of a dedicated processor, central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may include various input/output circuitry configured to serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display, or the like, but is not limited thereto. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may include various communication circuitry and be connected with the network 162 through wireless or wired communication to communicate with the external electronic device.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. Further, the wireless communication may include, e.g., wireless communication 164. The wireless communication 164 may include at least one of, e.g., wireless fidelity (Wi-Fi), bluetooth, near-field communication (NFC), or global navigation satellite system (GNSS). The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an example embodiment of the present disclosure, all or some of operations executed on the electronic device 101 may be executed on another or multiple other electronic devices (e.g., the electronic devices 102 and 104 or server 106). According to an example embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The processor 120 may process at least part of information obtained from other elements (e.g., at least one of the memory 130, the input/output interface 150, or the communication interface 170) and may use the same in various manners. For example, the processor 120 may control at least some functions of the electronic device 101 so that the electronic device 101 may interwork with another electronic device (e.g., the electronic device 102 or 104 or the server 106). The processor 120 may be integrated with the communication interface 170. According to an embodiment of the present disclosure, at least one configuration of the processor 120 may be included in the server 106 and may be supported for at least one operation implemented on the processor 120 from the server 106.

According to an example embodiment of the present disclosure, the memory 130 may include instructions enabling the processor 120 to operate. For example, the memory 130 may include instructions enabling the processor 120 to control other components of the electronic device 101 and to interwork with other electronic devices 102 and 104 or the server 106. The processor 120 may control other components of the electronic device 101 and interwork with the other electronic devices 102 and 104 or the server 106 based on the instructions stored in the memory 130. Hereinafter, operations of the electronic device 101 are described based on each component of the electronic device 101. The instructions enabling the components to operate may be included in the memory 130.

According to an example embodiment of the present disclosure, the electronic device 101 may include a sensor for sensing a direction of a first side surface of the electronic device 101. Any sensor capable of sensing the direction of the electronic device 101, such as, for example, and without limitation, a gyro sensor, may be used as the sensor. The direction of the first side surface of the electronic device 101 may be used to determine a direction in which the user views.

For example, the electronic device 101 may set a surface positioned opposite the display 160 of the electronic device 101 as the first surface and may determine the direction of the user's view by sensing the direction along which the first side surface faces.

According to an example embodiment of the present disclosure, the processor 120 may display, on the display 160, a first partial image of a panoramic image corresponding to the direction of the first side surface of the electronic device 101 sensed through the sensor. The panoramic image may be generated to represent an overall space set in a virtual reality (VR) service. Further, the panoramic image may include a left-eye panoramic image and a right-eye panoramic image to provide the VR service. The processor 120 may provide a three-dimensional (3D) effect to the user by displaying the left-eye panoramic image and the right-eye panoramic image to a left and right portion, respectively, of the display 160.

Further, the processor 120 may amplify first voice information associated with the first partial image and attenuate voice information associated with the remaining portion of the panoramic image except for the first partial image. Accordingly, the processor 120 may provide the user with a real-life voice effect.

According to an example embodiment of the present disclosure, the processor 120 may compare information about the first partial image with reference view information indicating a reference view of the panoramic image. The reference view of the panoramic image may, for example, be a view including a portion that the producer of the panoramic image desires to show or a view including a portion that the user desires to view from the panoramic image. The reference view of the panoramic image may be set by the producer of the panoramic image or the user, and the reference view information indicating the reference view of the panoramic image may be inserted into information (e.g., metadata) related to the panoramic image. Further, reference view information may be generated at each time of obtaining a plurality of images used for generating the panoramic image and may be inserted into information related to the panoramic image in association with the times of obtaining the plurality of images. An example method for generating reference view information is described below.

The reference view information may be information indicating the position or direction of the reference view of the panoramic image. For example, the reference view information may include at least one of coordinate information or direction information regarding the reference view of the panoramic image or information about an image capturing module that has obtained the image including the reference view of the panoramic image.

The information regarding the first partial image may include at least one of coordinate information regarding the first partial image, information about at least one image capturing module having obtained the image including the first partial image, and direction information regarding the first partial image.

The processor 120 may identify whether the reference view information is set in the panoramic image before comparing the first partial image information with the reference view information. For example, the processor 120 may determine whether the information related to the panoramic image contains the reference view information, and when the information related to the panoramic image contains the reference view information, the processor 120 may compare the first partial image information with the reference view information.

According to an example embodiment of the present disclosure, when the first partial image information differs from the reference view information, the processor 120 may determine a direction corresponding to the reference view information with respect to the first partial image. For example, when the first partial image is positioned relatively more left than is the partial image corresponding to the reference view information, the processor 120 may determine that the direction corresponding to the reference view information with respect to the first partial image is the right. Further, the processor 120 may also determine the distance between the first partial image and the partial image corresponding to the reference view information.

According to an example embodiment of the present disclosure, the processor 120 may provide information about the determined direction to the user. For example, the processor 120 may control the display 160 to display a graphical object representing the information about the determined direction on a preset area of the first partial image. The processor 120 may control the display 160 to display a graphical object, e.g., a right arrow, to indicate a right direction. However, this is merely an example, and the present disclosure is not limited thereto. Rather, various shapes of graphical objects may be used to indicate the determined direction.

In this example, the processor 120 may vary and display the graphical object depending on the determined distance between the first partial image and the partial image corresponding to the reference view information. For example, the processor 120 may display the graphical object while varying the size, position, or color of the graphical object depending on the determined distance, so that the user may intuitively recognize the distance between the first partial image and the partial image corresponding to the reference view information.

Further, the processor 120 may output a voice indicating the information about the determined direction through the input/output interface 150 (e.g., a speaker). For example, the processor 120 may enable a voice, such as "move to the right," to be output and may also output the determined distance in voice.

Further, the processor 120 may output a vibration depending on the information about the determined direction. For example, the processor 120 may output a vibration so that the user may sense the vibration on a right side, in order to notify the user that the determined direction is the right. The processor 120 may adjust the strength of the vibration to inform the user of the determined distance.

As such, the processor 120 may induce the user to move the electronic device 101 in a direction corresponding to the reference view information by providing the user with the information about the direction corresponding to the reference view information that is determined with respect to the first partial image of the panoramic image displayed on the display 160.

According to an example embodiment of the present disclosure, the processor 120 may control the display 160 so that the first partial image switches into a second partial image of the panoramic image corresponding to the reference view information. For example, upon sensing an event for varying images displayed (e.g., the user moving the electronic device 101 along a direction corresponding to the reference view information with respect to the first partial image provided to the user), the processor 120 may enable a switch of the first partial image into the second partial image corresponding to the reference view information and enable the second partial image to be displayed on the display 160. Further, although not sensing a movement of the electronic device 101, the processor 120 may enable a switch from the first partial image to the second partial image.

When the image displayed on the display 160 switches from the first partial image to the second partial image, the processor 120 may attenuate first voice information associated with the first partial image while amplifying second voice information associated with the second partial image.

Figure 2:
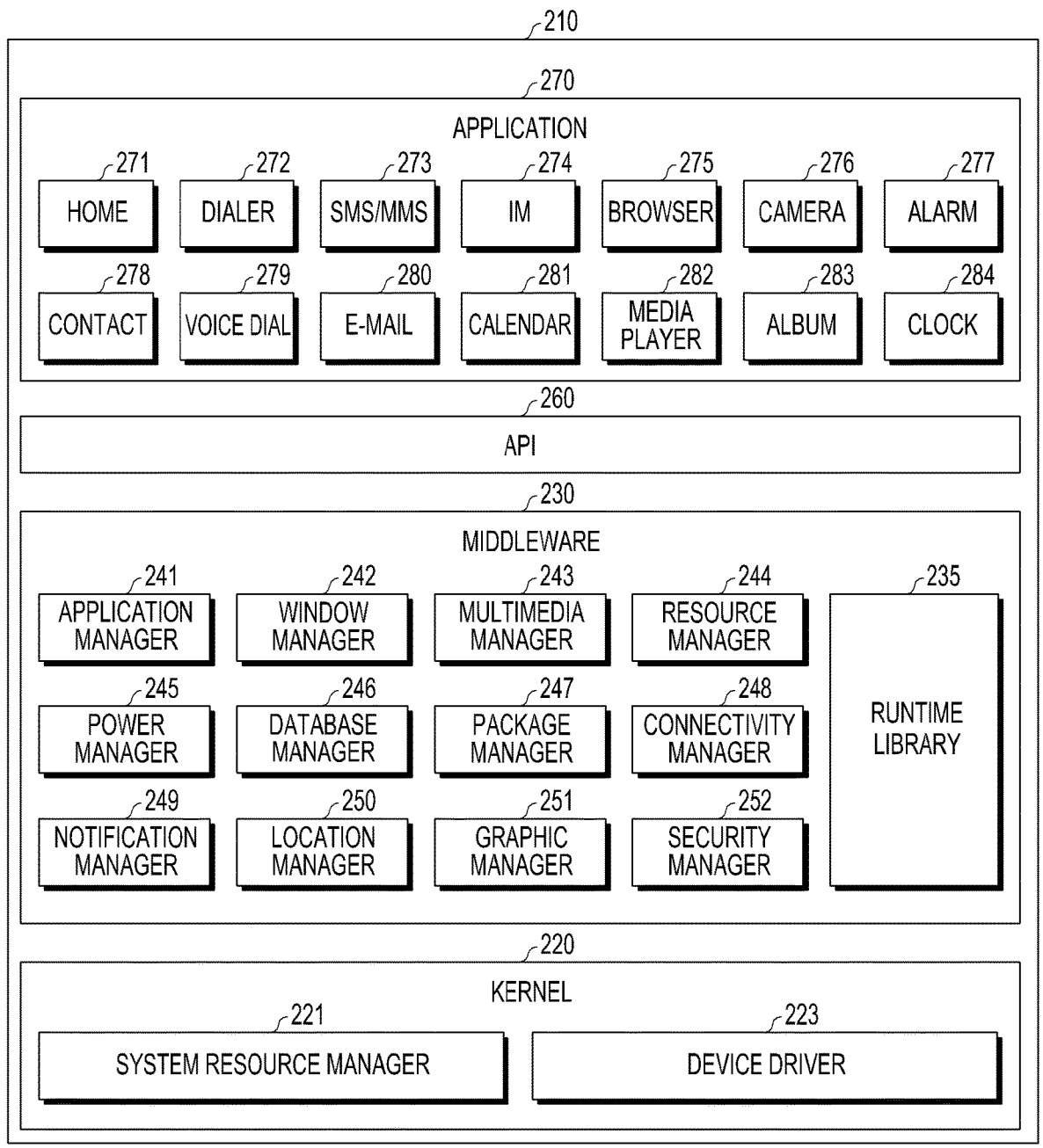
FIG. 2 is a block diagram illustrating an example program module according to an example embodiment of the present disclosure.

FIG. 2 is a block diagram illustrating an example program module according to an example embodiment of the present disclosure. According to an example embodiment of the present disclosure, the program module 210 (e.g., the program 140) may include an operating system (OS) controlling resources related to the electronic device (e.g., the electronic device 101) and/or various applications (e.g., the application processor 147) driven on the operating system. The operating system may include, e.g., Android, iOS, Windows, Symbian, Tizen, or Bada.

The program 210 may include, e.g., a kernel 220, middleware 230, an application programming interface (API) 260, and/or an application 270. At least a part of the program module 210 may be preloaded on the electronic device or may be downloaded from an external electronic device (e.g., the electronic devices 102 and 104 or server 106).

The kernel 220 (e.g., the kernel 141) may include, e.g., a system resource manager 221 and/or a device driver 223. The system resource manager 221 may perform control, allocation, or recovery of system resources. According to an example embodiment of the present disclosure, the system resource manager 221 may include a process managing unit, a memory managing unit, or a file system managing unit. The device driver 223 may include, e.g., a display driver, a camera driver, a Bluetooth driver, a shared memory driver, a USB driver, a keypad driver, a Wi-Fi driver, an audio driver, or an inter-process communication (IPC) driver.

The middleware 230 may provide various functions to the application 270 through the API 260 so that the application 270 may efficiently use limited system resources in the electronic device or provide functions jointly required by applications 270. According to an example embodiment of the present disclosure, the middleware 230 (e.g., the middleware 143) may include at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, or a security manager 252.

The runtime library 235 may include a library module used by a compiler in order to add a new function through a programming language while, e.g., the application 270 is being executed. The runtime library 235 may perform input/output management, memory management, or operation on arithmetic functions.

The application manager 241 may manage the life cycle of at least one application of, e.g., the applications 270. The window manager 242 may manage GUI resources used on the screen. The multimedia manager 243 may grasp formats necessary to play various media files and use a codec appropriate for a format to perform encoding or decoding on media files. The resource manager 244 may manage resources, such as source code of at least one of the applications 270, memory or storage space.

The power manager 245 may operate together with, e.g., a basic input/output system (BIOS) to manage battery or power and provide power information necessary for operating the electronic device. The database manager 246 may generate, search, or vary a database to be used in at least one of the applications 270. The package manager 247 may manage installation or update of an application that is distributed in the form of a package file.

The connectivity manager 248 may manage wireless connectivity, such as, e.g., Wi-Fi or Bluetooth. The notification manager 249 may display or notify an event, such as a coming message, appointment, or proximity notification, of the user without interfering with the user. The location manager 250 may manage locational information on the electronic device. The graphic manager 251 may manage graphic effects to be offered to the user and their related user interface. The security manager 252 may provide various security functions necessary for system security or user authentication. According to an embodiment of the present disclosure, when the electronic device (e.g., the electronic device 101) has telephony capability, the middleware 230 may further include a telephony manager for managing voice call or video call functions of the electronic device.

The middleware 230 may include a middleware module forming a combination of various functions of the above-described components. The middleware 230 may provide a specified module per type of the operating system in order to provide a differentiated function. Further, the middleware 230 may dynamically omit some existing components or add new components.

The API 260 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 270 (e.g., the application processor 147) may include one or more applications that may provide functions such as, e.g., a home 271, a dialer 272, a short message service (SMS)/multimedia messaging service (MMS) 273, an instant message (IM) 274, a browser 275, a camera 276, an alarm 277, a contact 278, a voice dial 279, an e-mail 280, a calendar 281, a media player 282, an album 283, or a clock 284, a health-care (e.g., measuring the degree of workout or blood sugar), or provision of environmental information (e.g., provision of air pressure, moisture, or temperature information).

According to an example embodiment of the present disclosure, the application 270 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an example embodiment of the present disclosure, the application 270 may include an application (e.g., a health-care application of a mobile medical device) designated according to an attribute of the external electronic device (e.g., the electronic devices 102 and 104). According to an example embodiment of the present disclosure, the application 270 may include an application received from the external electronic device (e.g., the server 106 or electronic devices 102 and 104). According to an embodiment of the present disclosure, the application 270 may include a preloaded application or a third party application downloadable from a server. The names of the components of the program module 210 according to the shown embodiment may be varied depending on the type of operating system.

According to an example embodiment of the present disclosure, at least a part of the program module 210 may be implemented in software, firmware, hardware, or in a combination of two or more thereof. At least a part of the programming module 210 may be implemented (e.g., executed) by e.g., a processor (e.g., the processor 210). At least a part of the program module 210 may include e.g., a module, program, routine, set of instructions, process, or the like for performing one or more functions.

Figure 3A:
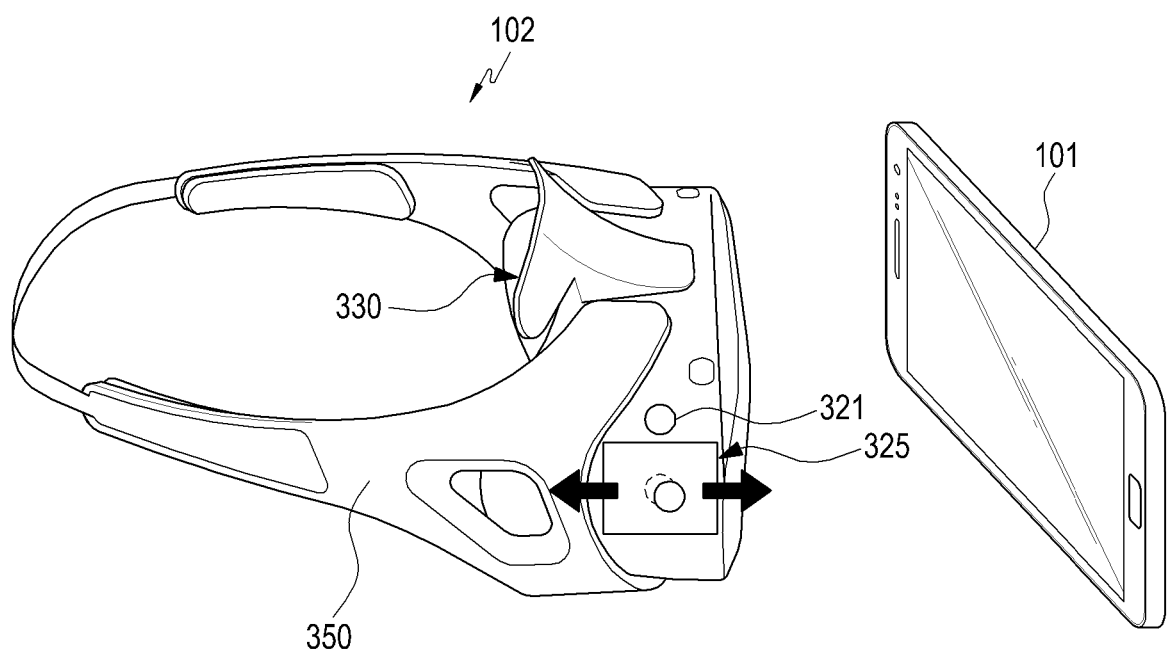
FIG. 3A is a perspective view illustrating an example electronic device and a relevant electronic device according to an example embodiment of the present disclosure.

FIG. 3A is a perspective view illustrating an example electronic device and a relevant electronic device according to an example embodiment of the present disclosure.

The electronic device 101 may include a display 160. Further, the electronic device 101 may store a virtual reality (VR) application. The VR application may be an application that may provide a reallife-like image to the user through the display 160. The VR application may display, on the display 160, a left-eye image and right-eye image, respectively corresponding to the user's eyes, based on a stereo scheme.

The electronic device 102 may, for example, be a head mounted theater (HMT) apparatus. The HMT apparatus may be worn on the user's head to be fastened to the user's head despite the user's movement. Further, the HMT apparatus may also fasten the electronic device 101 so that the user may observe an image displayed on the electronic device 101.

An electronic device 102 may include a housing 350 configured to be worn on the user's head, a dark change portion 330 fastened to the housing 350 and provided at a region corresponding to the user's eyes, and at least one input button 321 provided at a region of the housing 350. Further, the electronic device 102 may include an input pad 325 through which a swipe input may be received from the user.

The user may bring his eyes in tight contact with the dark change portion 330, allowing the user to observe an image by the VR application provided from the electronic device 101 without interference from external light.

The electronic device 101 may be coupled to the electronic device 102. The electronic device 101 may be connected by wire or wirelessly connected with the electronic device 102. For example, the electronic device 101 may be connected with the electronic device 102 through a universal serial bus (USB), but this is merely an example. It will be appreciated by one of ordinary skill in the art that any other connections that enable data communication between the electronic devices 101 and 102 may be used without limitation. According to an example embodiment of the present disclosure, the electronic device 101 may be coupled with the electronic device 102 simply in a physical way.

Figure 3B:
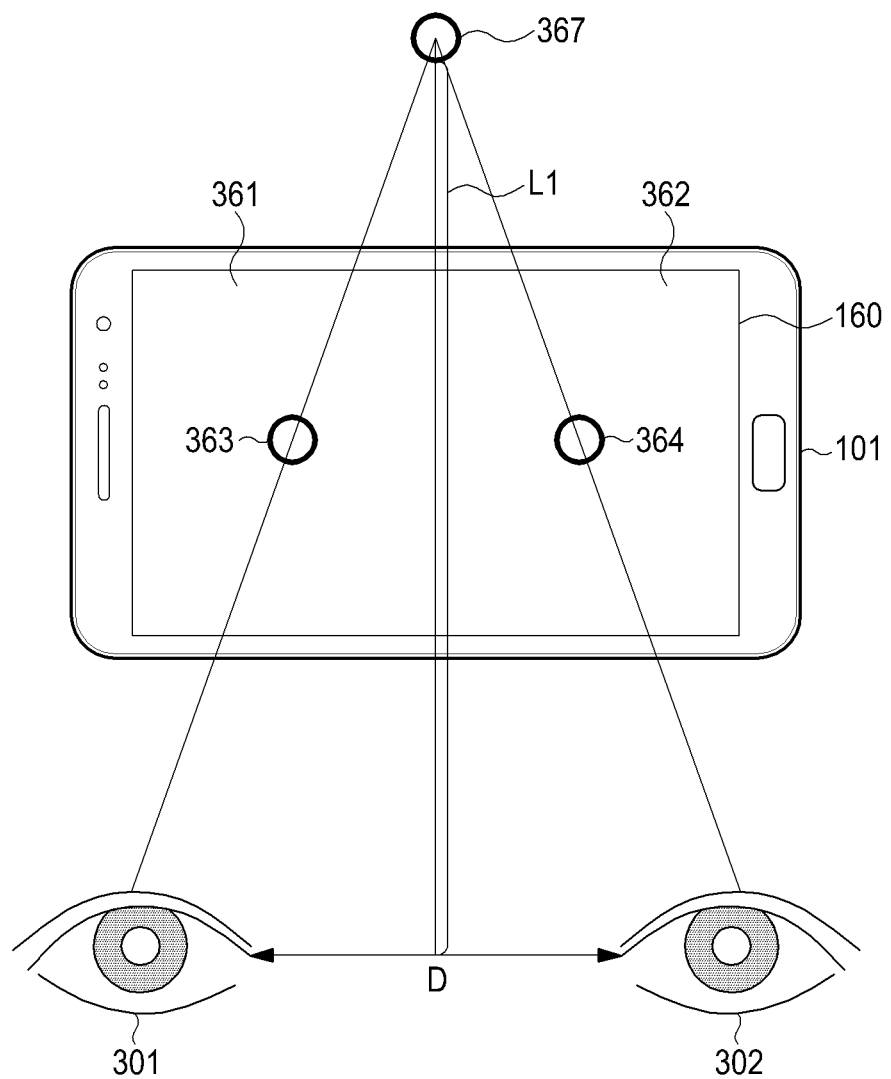
FIG. 3B is a diagram illustrating an example display by an electronic device according to an example embodiment of the present disclosure.

FIG. 3B is a diagram illustrating an example display by an electronic device according to an example embodiment of the present disclosure.

Referring to FIG. 3B, the electronic device 101 may display a left-eye image 361 and right-eye image 362 on the display 160. The left-eye image 361 may include a first object 363, and the right-eye image 362 may include a second object 364. For example, the first object 363 may correspond to the left eye 301, and the second object 364 may correspond to the right eye 302.

Referring to FIG. 3B, the inter pupillary distance (IPD), which is a distance between the left eye 301 and the right eye 302, may, for example, be D. The left-eye image 361 and the right-eye image 362 may correspond to the user's eyes and may be images allowing the user to view images while feeling a depth. As such, the left-eye image 361 and the right-eye image 362 may be images for a VR service and may be images configured to provide a stereoscopic feel for a portion of an overall image for a VR service. Further, the left-eye image 361 and the right-eye image 362 may be partial images of a panoramic image generated to display an overall space using images obtained through a plurality of cameras. For example, the left-eye image 361 and the right-eye image 362 may be partial images of the panoramic image corresponding to the direction in which a side surface of the electronic device 101 faces.

The electronic device 101 may display the first object 363 and the second object 364 with them spaced apart from each other by a predetermined distance. The user may determine that an object image 367 is present at a point where a straight line passing through the left eye 301 and the first object 363 crosses a straight line passing through the right eye 302 and the second object 364. For example, the user may observe the presence of the object at a point that is positioned away from the user by L1.

Figure 3C:
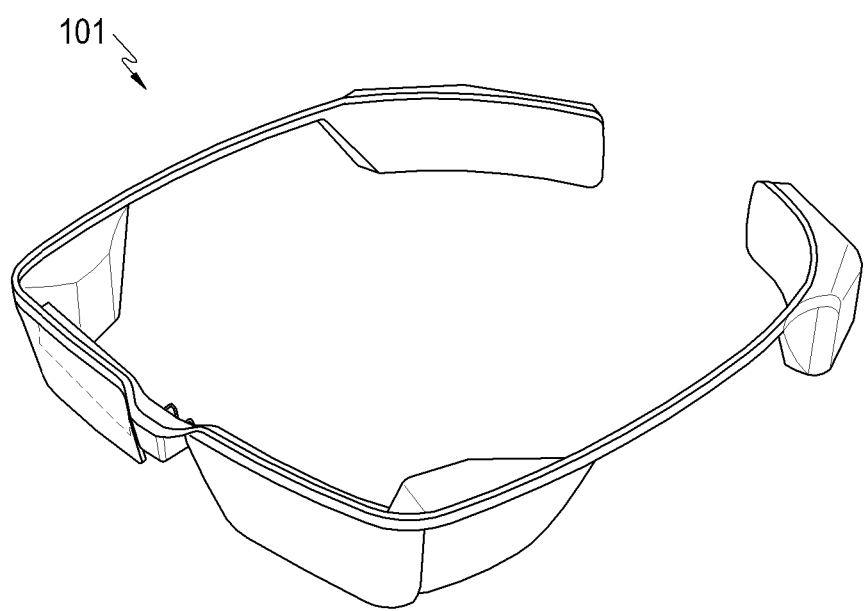
FIG. 3C is a diagram illustrating an example electronic device according to an example embodiment of the present disclosure.

FIG. 3C is a diagram illustrating an example electronic device according to an example embodiment of the present disclosure.

According to an example embodiment of the present disclosure, the electronic device 101 may be configured in the form of glasses wearable by the user as illustrated in FIG. 3C. The electronic device 101 configured as glasses may include a display 160 and may provide the user with a reallife-like image through a VR application on the display 160. The electronic device 101 may display, on the display 160 and through the VR application, a left-eye image and right-eye image, respectively corresponding to the user's eyes, based on a stereo scheme.

Figure 3D:
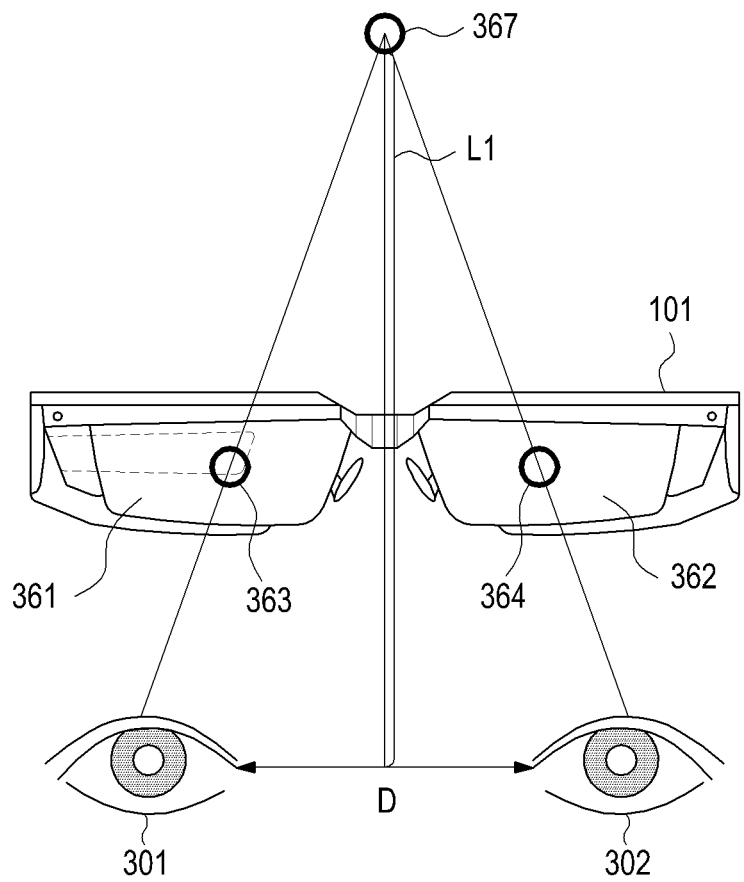
FIG. 3D is a diagram illustrating an example display by an electronic device according to an example embodiment of the present disclosure.

FIG. 3D is a diagram illustrating an example display by an example electronic device according to an example embodiment of the present disclosure.

Referring to FIG. 3D, the electronic device 101 illustrated in FIG. 3C may display a left-eye image 361 and right-eye image 362 on the display 160. The left-eye image 361 may include a first object 363, and the right-eye image 362 may include a second object 364. For example, the first object 363 may correspond to the left eye 301, and the second object 364 may correspond to the right eye 302.

As illustrated in FIG. 3D, the IPD, which is a distance between the left eye 301 and the right eye 302, may be D. The left-eye image 361 and the right-eye image 362 may correspond to the user's eyes and may be images allowing the user to view images while feeling a depth. As such, the left-eye image 361 and the right-eye image 362 may be images for a VR service and may be images configured to provide a stereoscopic feel for a portion of an overall image for a VR service. Further, the left-eye image 361 and the right-eye image 362 may be partial images of a panoramic image generated to display an overall space using images obtained through a plurality of cameras. For example, the left-eye image 361 and the right-eye image 362 may be partial images of the panoramic image corresponding to the direction in which a side surface of the electronic device 101 faces.

The electronic device 101 may display the first object 363 and the second object 364 with them spaced apart from each other at a predetermined distance. The user may determine that an object image 367 is present at a point where a straight line passing through the left eye 301 and the first object 363 crosses a straight line passing through the right eye 302 and the second object 364. For example, the user may observe the presence of the object at a point that is positioned away from the user by L1.

Figure 3E:
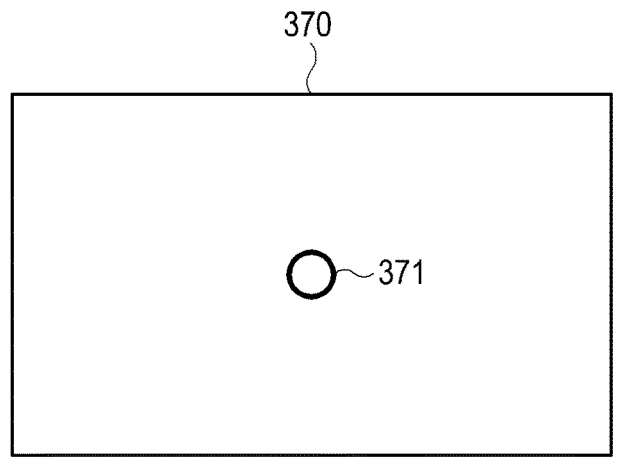
FIG. 3E is a diagram illustrating an example screen viewed by a user.

FIG. 3E is a diagram illustrating an example screen viewed by a user. As illustrated in FIG. 3E, the user may observe a screen including an image 371 of the same shape as the first object 363 and second object 364 through the left-eye image 361 and the right-eye image 362 displayed on the electronic device 101.

Figure 4:
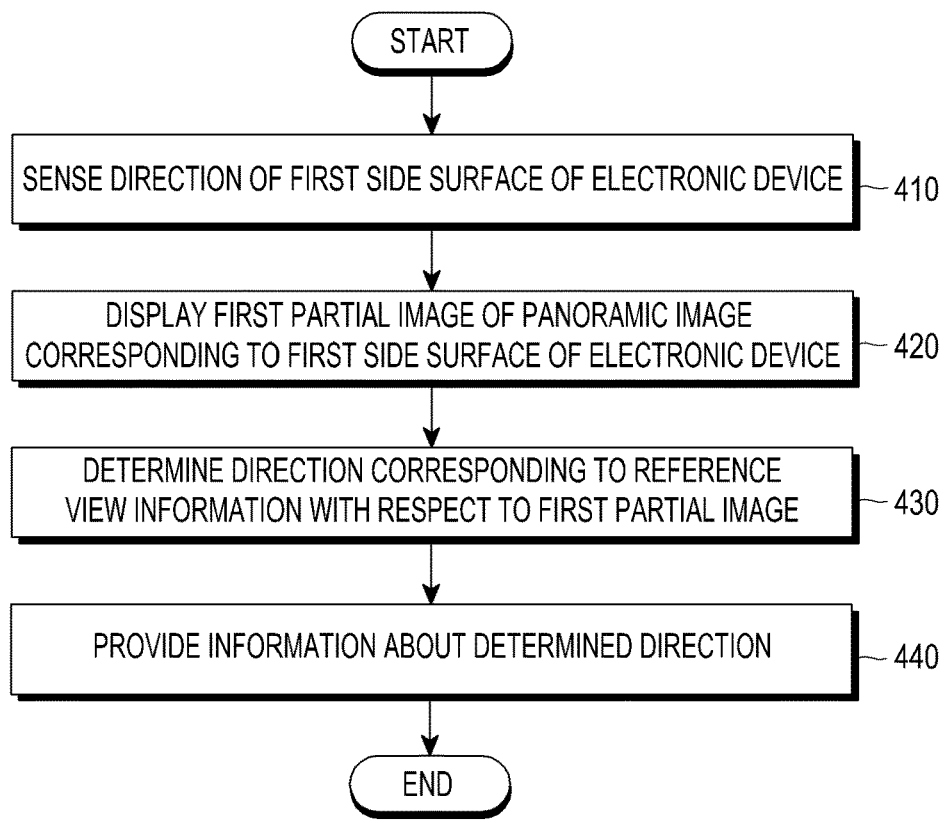
FIG. 4 is a flowchart illustrating an example method for generating a panoramic image by an electronic device according to an example embodiment of the present disclosure.

FIG. 4 is a flowchart illustrating an example method for generating a panoramic image by an electronic device according to an example embodiment of the present disclosure.

In operation 410, the electronic device 101 may sense a direction of a first side surface of the electronic device 101 through a sensor. The direction of the first side surface of the electronic device 101 may be used to determine a direction in which the user views.

For example, the electronic device 101 may set a surface positioned opposite the display 160 of the electronic device 101 as the first surface and may determine the direction of the user's view by sensing the direction along which the first side surface faces.

In operation 420, the electronic device 101 may display, on the display 160, a first partial image of a panoramic image corresponding to the direction of the first side surface of the electronic device 101 sensed through the sensor. The panoramic image may include a left-eye panoramic image and a right-eye panoramic image to provide the VR service. The electronic device 101 may display a first partial image for the right-eye and a first partial image for the left-eye on a preset right portion and left portion of the display 160.

In operation 430, when the first partial image information differs from the reference view information, the electronic device 101 may determine a direction corresponding to the reference view information with respect to the first partial image. For example, when the first partial image is positioned relatively more left than is the partial image corresponding to the reference view information, the processor 120 may determine that the direction corresponding to the reference view information with respect to the first partial image is the right. Further, the processor 120 may also determine the distance between the first partial image and the partial image corresponding to the reference view information.

In operation 440, the electronic device 101 may provide information about the determined direction to the user. For example, the electronic device 101 may display on the display 160 a graphical object representing information about the determined direction, output through a speaker a voice representing the information about the determined direction, and output a vibration according to the information about the determined direction. Further, the electronic device 101 may output the graphical object, voice, or vibration to indicate the distance between the determined first partial image and the partial image corresponding to the reference view information.

Further, the electronic device 101 may output all of the graphical object, voice, and vibration or only two of the graphical object, voice, or vibration, etc.

Figure 5A:
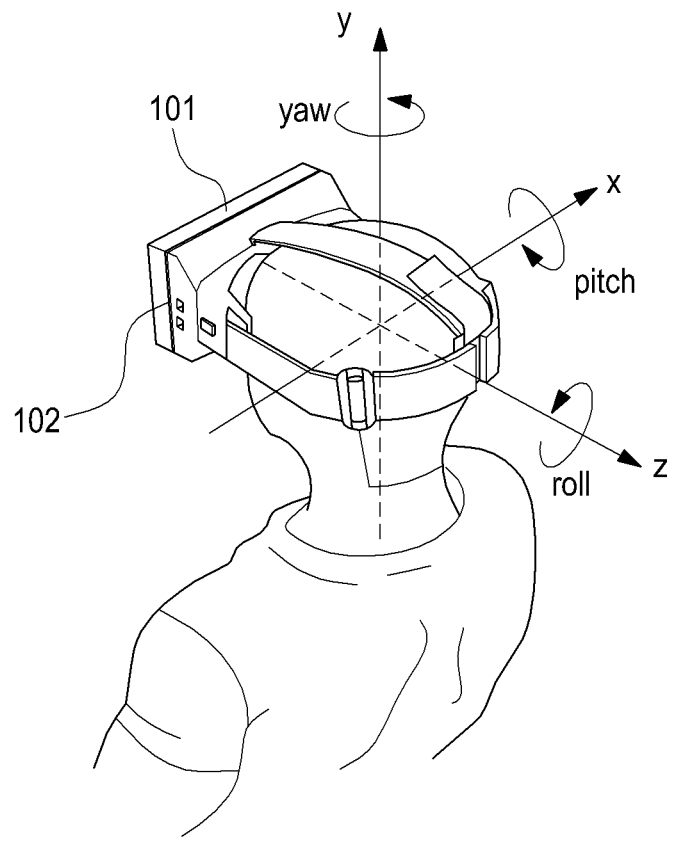
FIG. 5A is a perspective view illustrating an example in which a user wears an HMT apparatus according to an example embodiment of the present disclosure.

FIG. 5A is a perspective view illustrating an example in which a user wears an HMT apparatus according to an example embodiment of the present disclosure.

The user may put the housing 350 on his head. Further, the electronic device 101 may be coupled with the electronic device 102, and the user may view images displayed on the display of the electronic device 101.

The electronic device 101 may display a left-eye image and right-eye image on left and right portions, respectively, of the display. The image for left eye may be incident onto the user's left eye, and the image for right eye may be incident onto the user's right eye. For example, the image for left eye and the image for right eye may be incident onto each of the user's eyes. The user may receive a VR service by observing the images incident onto his eyes.

The VR application executed on the electronic device 101 may allow an image for both eyes to be displayed on the display. Further, the VR application may vary and display the image for both eyes based on a motion (yaw, pitch, or roll) of the user or the electronic device 102. For example, the VR application may switch the image for both eyes from the first partial image of the panoramic image to the second partial image of the panoramic image based on the motion (yaw, pitch, or roll) of the electronic device 102 or the user in the panoramic image displaying the overall space and display.

The electronic device 101 may receive a command through at least one of the input button 321 and the input pad 325 (see FIG. 3A) from the user. For example, the electronic device 101 may obtain a focusing command, manipulation command, or a command to change into a partial image corresponding to the reference view from the electronic device 102. Or, the user may directly enter into the electronic device 101 a focusing command, manipulation command, or a command to change into the partial image corresponding to the reference view.

For example, when the user enters a swipe gesture in a first direction of the input pad 325, the electronic device 101 may perform a manipulation command corresponding thereto.

FIGS. 5B, 5C, 5D and 5E are diagrams illustrating an example of varying a partial image of a panoramic image displayed on an electronic device according to an example embodiment of the present disclosure.

As illustrated in FIG. 5B, the user may view in a first direction 511 while wearing the electronic device 101. The electronic device 101 may sense a direction where a first side surface of the electronic device 101 faces as the user views in the first direction 511. The direction in which the first side surface of the electronic device 101 faces may be used to determine the direction in which the user views.

The electronic device 101 may display the left-eye image and right-eye image corresponding to the first partial image 521 so that the user may view the first partial image 521 of the panoramic image displaying an overall space corresponding to the direction where the first side surface faces. The first partial image 521 may be an image corresponding to a portion of the panoramic image displaying the overall space set in a VR service.

Figure 5C:
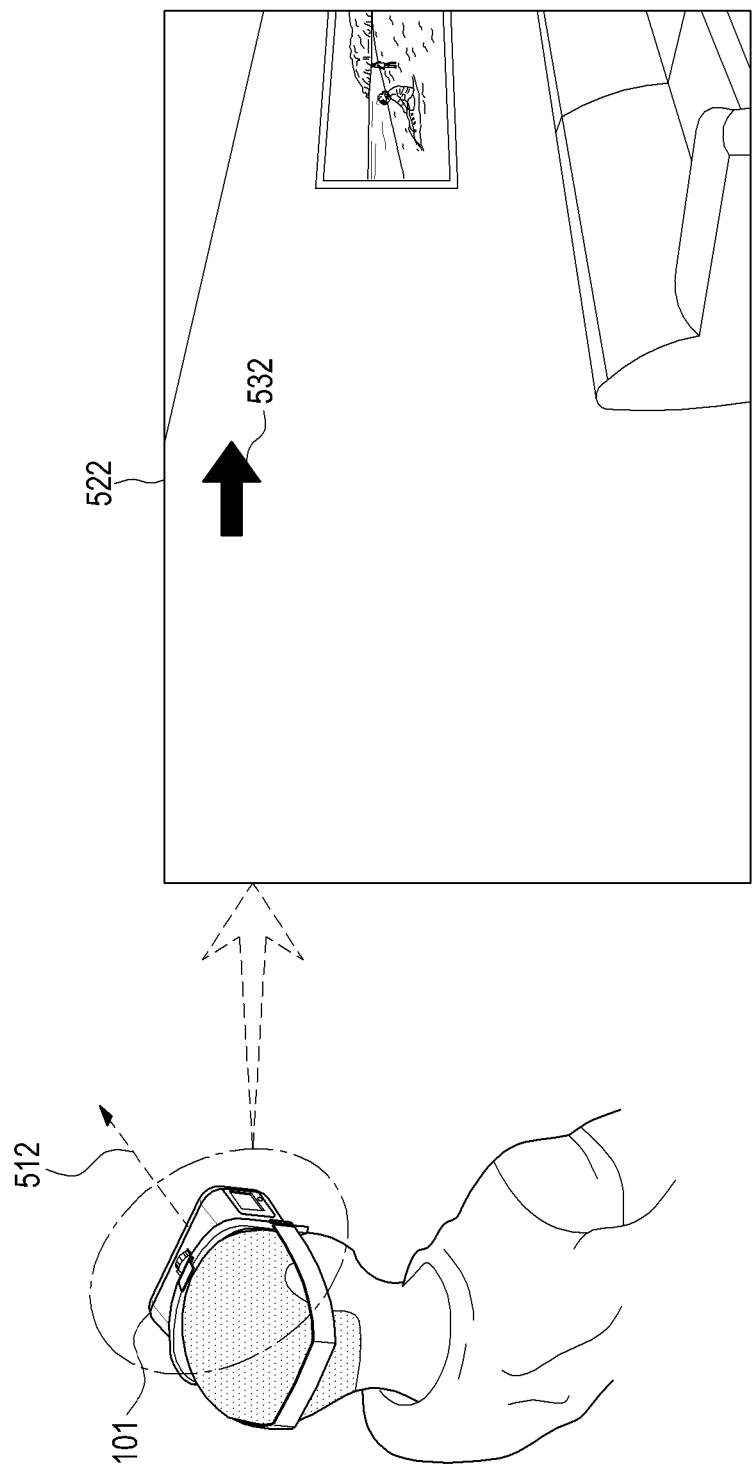
Figure 5D:
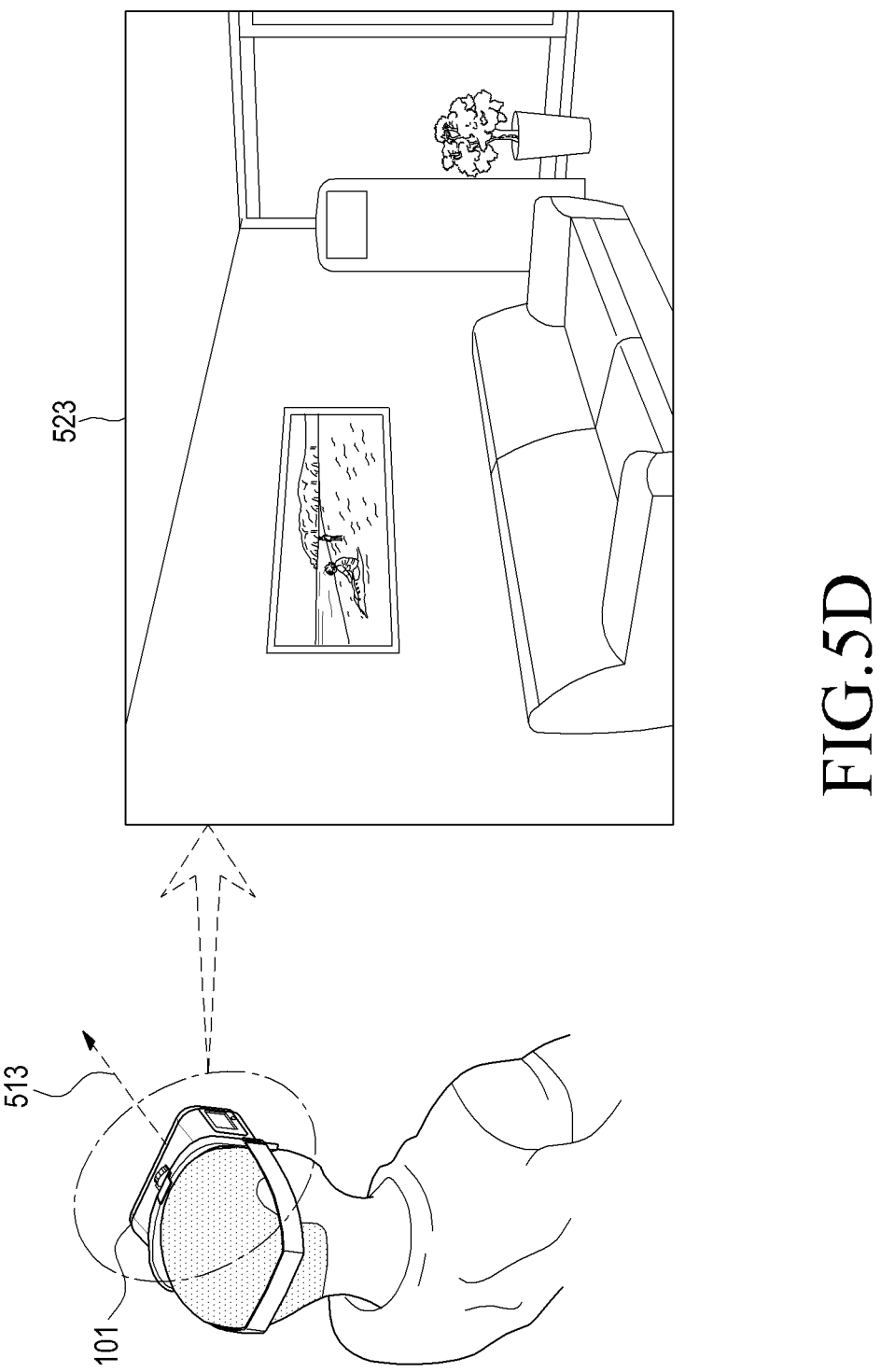
Figure 5E:
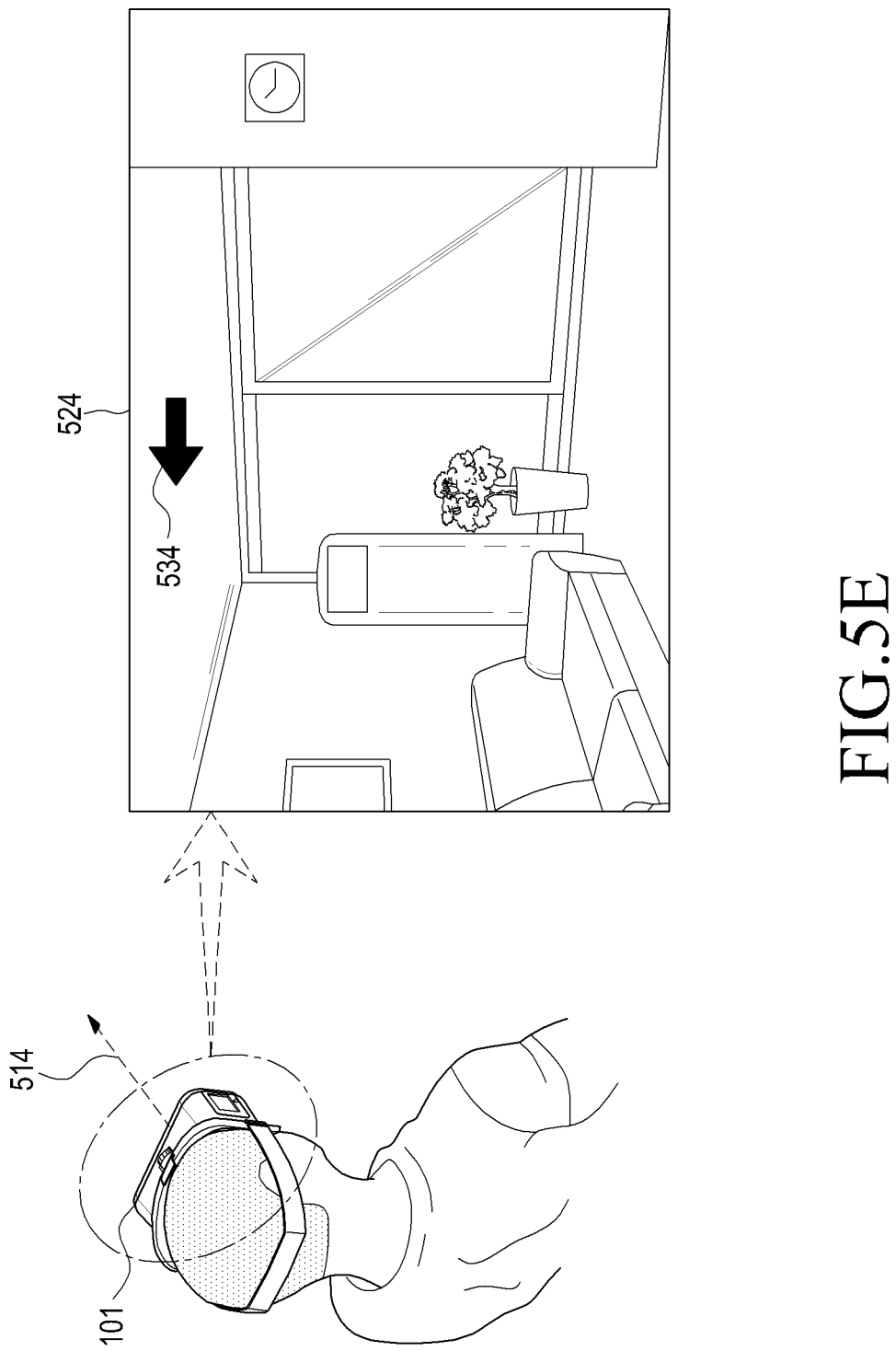

Meanwhile, the user may turn his head in a right direction 501, and the electronic device 101 may sense the turn in the right direction 501 and sense a variation in direction of the electronic device 101. As illustrated in FIGS. 5C to 5E, the user may turn his head from a first direction 511 to a second direction 512, a third direction 513, and a fourth direction 514. The electronic device 101 may sense the turn from the first direction 511 to the fourth direction 514 and may sense a variation in direction of the first side surface of the electronic device 101 that is varied by the turn.

As the electronic device 101 senses the direction of the first side surface of the electronic device 101 varied as the user turns his head to the right, the electronic device 101 may vary and display the first partial image 521. For example, the electronic device 101 may display a second partial image 522 corresponding to the second direction 512, a third partial image 523 corresponding to the third direction 513, and a fourth partial image 524 corresponding to the fourth direction 514. For example, the electronic device 101 may display a left-eye image and right-eye image for displaying each partial image. The first partial image 521 to the fourth partial image 524 each may be a partial image of a panoramic image representing an overall space constituting a VR service.

As illustrated in FIGS. 5B to 5E, the second partial image 522 may be a partial image for a foreground positioned relatively to the right of the first partial image 521, the third partial image 523 may be a screen for the foreground positioned relatively to the right of the second partial image 522, and the fourth partial image 524 may be a screen for the foreground positioned relatively to the right of the third partial image. Accordingly, as the user turns his head to the right, the user may sequentially and relatively see the right-hand foregrounds.

Further, the electronic device 101 may display information about the direction corresponding to the reference view information representing the reference view of the panoramic image with respect to the partial image displayed on the display 160, along with the partial image corresponding to the direction where the first side surface of the electronic device 101 faces. The following description assumes that the third partial image 523 illustrated in FIG. 5D is a partial image corresponding to the reference view information.

As described above, the electronic device 101 may display the first partial image 521 as the user views in the first direction 511. The electronic device 101 may determine the direction corresponding to the reference view information with respect to the first partial image 521. The direction corresponding to the reference view information may be a right direction with respect to the first partial image 521. Accordingly, the electronic device 101 may display a first graphical object 531 indicating that the direction corresponding to the reference view information is the right. Although an example is described below in which graphical objects are displayed to provide the user with a direction corresponding to reference view information, embodiments of the present disclosure are not limited thereto. For example, a voice or vibration may be used to provide the user with the direction corresponding to the reference view information.

The electronic device 101 may display the second partial image 522 as the user turns his head to view in the second direction 512. The electronic device 101 may determine the direction corresponding to the reference view information with respect to the second partial image 522. The direction corresponding to the reference view information may be a right direction with respect to the second partial image 522. Accordingly, the electronic device 101 may display a second graphical object 532 indicating that the direction corresponding to the reference view information is the right. Since the second partial image 522 is positioned relatively close to the point corresponding to the reference view information as compared with the first partial image 521, the second graphical object 532 may be displayed in a smaller size than the first graphical object 531. However, example embodiments of the present disclosure are not limited thereto. For example, the graphical object indicating the direction corresponding to the reference view information may be displayed in various manners to inform the user of a relative distance through the position, size, or color.

The electronic device 101 may display the third partial image 523 as the user turns his head to view in the third direction 513. The electronic device 101 may determine the direction corresponding to the reference view information with respect to the third partial image 523. As described above, since the third partial image 523 is a partial image corresponding to the reference view information, the electronic device 101 may abstain from displaying a graphical object indicating the direction corresponding to the reference view information. Further, although not shown, the electronic device 101 may inform the user that the third partial image 523 displayed on the display 160 corresponds to the reference view information through a message, voice, graphical object, or vibration.

The electronic device 101 may display the fourth partial image 524 as the user turns his head to view in the fourth direction 514. The electronic device 101 may determine the direction corresponding to the reference view information with respect to the fourth partial image 524. The direction corresponding to the reference view information may be a left direction with respect to the fourth partial image 524. Accordingly, the electronic device 101 may display a third graphical object 534 indicating that the direction corresponding to the reference view information is the left.

Further, even when the user does not turn his head, the electronic device 101 may change the information displayed on the display 160 from the first partial image 521 to the third partial image 523 corresponding to the reference view information.

As such, the electronic device 101 may easily discover the partial image corresponding to the reference view information by providing the user with the information about the direction corresponding to the reference view information.

Figure 6A:
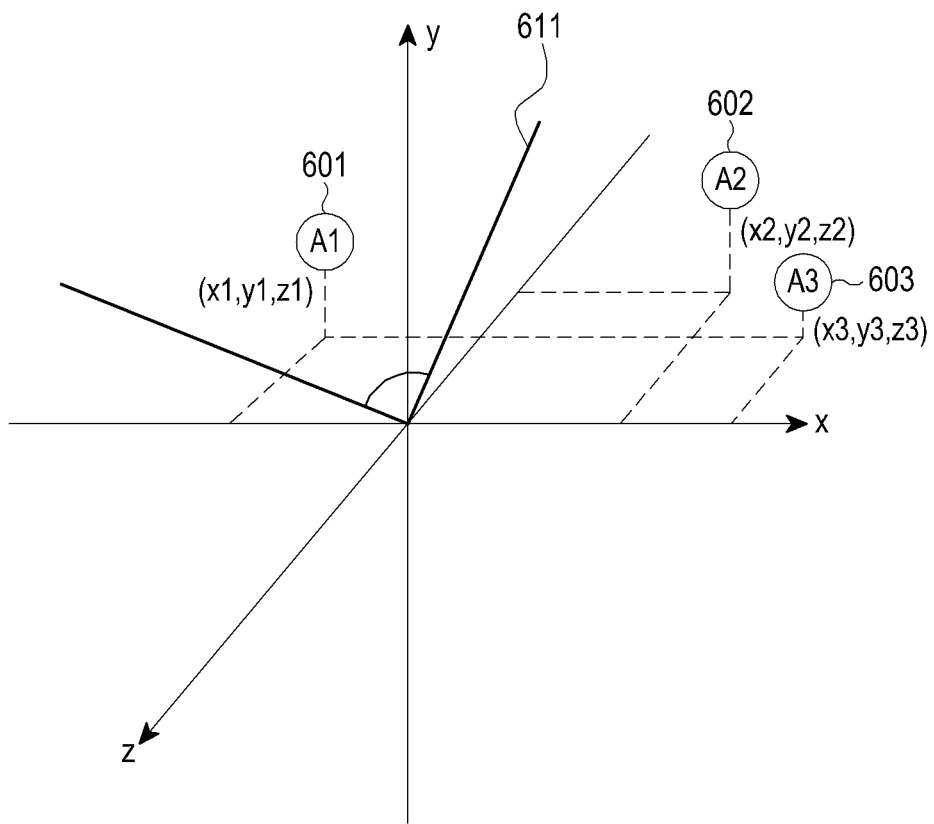
FIG. 6A is a diagram illustrating an example overall panoramic image of a VR service according to an example embodiment of the present disclosure.

FIG. 6A is a diagram illustrating an example overall panoramic image including a VR service according to an example embodiment of the present disclosure.

FIG. 6A is a concept view illustrating a panoramic image including a VR service according to an example embodiment of the present disclosure. Referring to FIG. 6A, the panoramic image may be configured in 3D. The panoramic image may include at least one object 601, 602, and 603. The first object 601 may be placed at a first position (x1,y1,z1), the second object may be placed at a second position (x2,y2,z2), and the third object 603 may be placed at a third position (x3,y3,z3). The objects 601, 602, and 603 are images contained in the panoramic image, and are not limited in their type.

Meanwhile, a first user view 611 may be set in the panoramic image. In the embodiment illustrated in FIG. 6A, the first object 601 may be included in the first user view 611. The electronic device 101 may display a first partial image corresponding to the first user view 611. The first user view 611 may be determined as per the direction of a first side surface of the electronic device 101 sensed through a sensor. For example, the first user view 611 may be determined based on the relation between the first direction and the direction in which the first side surface of the electronic device 101 faces with respect to the first side surface of the electronic device 101 facing in the first direction.

Figure 6B:
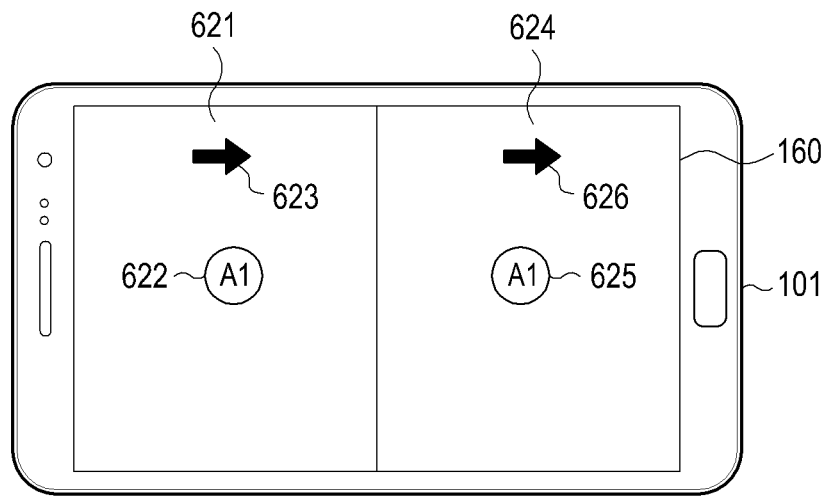
FIG. 6B is a diagram illustrating an electronic device according to an example embodiment of the present disclosure.

For example, the electronic device 101 may display a left-eye image 621 and a right-eye image 624 as illustrated in FIG. 6B. The left-eye image 621 may include a first graphical object 623 for the left eye indicating the direction corresponding to the reference view information of the panoramic image with respect to the first partial image and the first object 622 for the left eye. The right-eye image 624 may include a first graphical object 626 for the right eye indicating the direction corresponding to the reference view information of the panoramic image with respect to the first partial image and the first object 625 for the right eye.

Figure 6C:
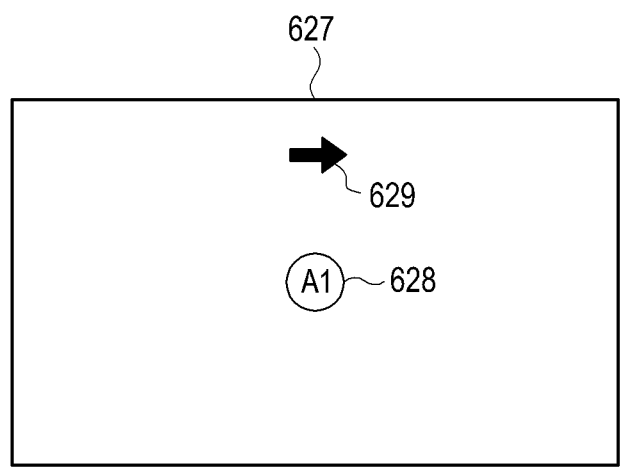
FIG. 6C is a diagram illustrating an example partial image of a panoramic image viewed by a user according to an example embodiment of the present disclosure.

The user may see the electronic device 101 and may view the first partial image 627 as illustrated in FIG. 6C. The first partial image 627 viewed by the user may include the first object 628 and the first graphical object 629. The first partial image may be an image obtained by projecting the panoramic image on a plane corresponding to the first user view 611.

Figure 6D:
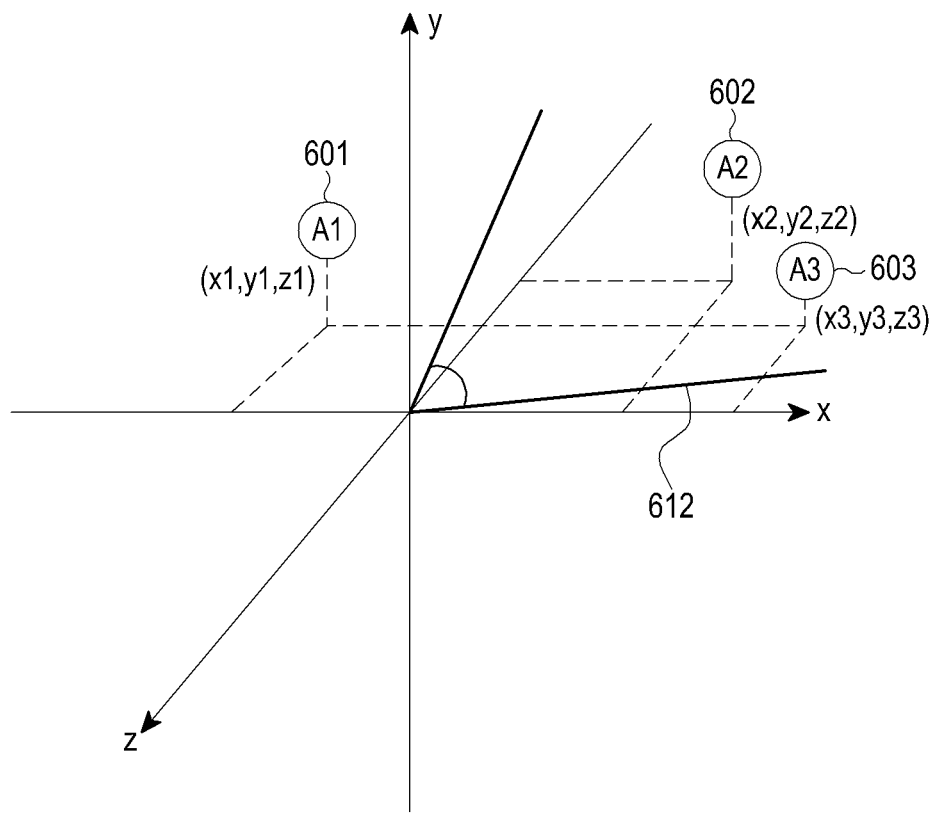
FIG. 6D is a diagram illustrating an example overall panoramic image constituting a VR service according to an example embodiment of the present disclosure.

Meanwhile, the electronic device 101 may detect a screen change event. For example, the screen change event may be a change in direction of the first side surface of the electronic device 101 which is sensed by a motion, e.g., rotation, of the electronic device 101. The user may turn his head while wearing the electronic device 101 as illustrated in FIGS. 5B to 5E. The electronic device 101 may sense a change in the direction where the first side surface of the electronic device 101 faces as the user turns his head and may change the user view into a second user view 612 as illustrated in FIG. 6D, corresponding to the changed direction in which the first side surface of the electronic device 101 faces. The second user view 612 may include the second object 602 and the third object 603.

The electronic device 101 may change the user view from the first user view 611 to the second user view 612 corresponding to an angle at which the direction where the first side surface of the electronic device 101 faces is varied. Meanwhile, it should be understood by one of ordinary skill in the art that a motion of the electronic device 101 being the screen change event is merely an example, and is not limited thereto, any input method detectable by the electronic device 101 may be put to use.

According to an example embodiment of the present disclosure, the angle at which the direction where the first side surface of the electronic device 101 faces is varied may include two angles in spherical coordinate system that are perpendicular to each other, e.g., a first angle θ on the xy plane whose rotation axis is the z axis and a second angle φ which is an angle from the xy plane. According to an example embodiment of the present disclosure, the electronic device 101 may rotate the first user view 611 to determine the second user view 612 with the angle at which the direction where the first side surface of the electronic device 101 faces is varied. Or, the electronic device 101 may determine an angle of rotation of the panoramic image using the angle at which the direction where the first side surface of the electronic device 101 faces is varied and may also determine the second user view 612 by rotating the first user view 611 at the angle of rotation of the panoramic image. The electronic device 101 may display the second partial image corresponding to the second user view 612.

Figure 6E:
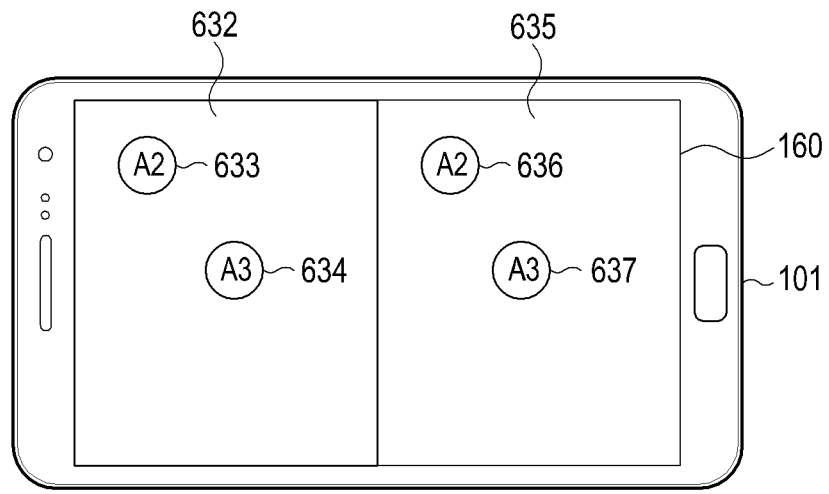
FIG. 6E is a diagram illustrating an example electronic device according to an example embodiment of the present disclosure.

The electronic device 101 may display a left-eye image 632 and right-eye image 635 corresponding to the second partial image as illustrated in FIG. 6E. The left-eye image 632 may include a second object 633 for the left eye and a third object 634 for the left eye, and the right-eye image 635 may include a second object 636 for the right eye and a third object 637 for the right eye. Further, when the second partial image is a partial image corresponding to the reference view information in the panoramic image as illustrated in FIG. 5D, no graphical object may be displayed which indicates the direction corresponding to the reference view information with respect to the second partial image contrary to what is illustrated in FIG. 6B.

Figure 6F:
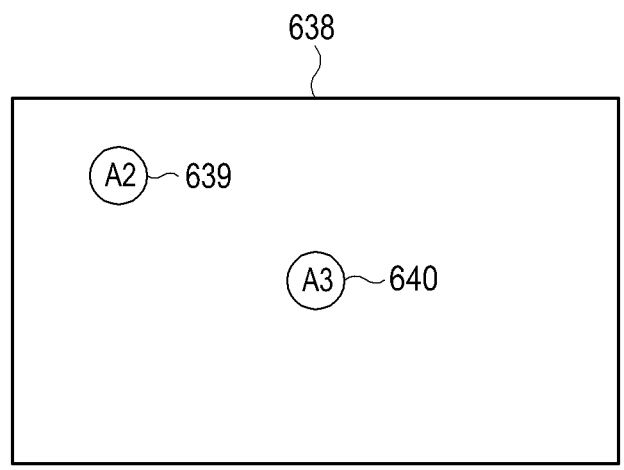
FIG. 6F is a diagram illustrating an example partial image of a panoramic image viewed by a user according to an example embodiment of the present disclosure.

The user may see the electronic device 101 and may view the second partial image 638 as illustrated in FIG. 6F. The second partial image 638 viewed by the user may include the second object 639 and the third object 640.

Figure 6G:
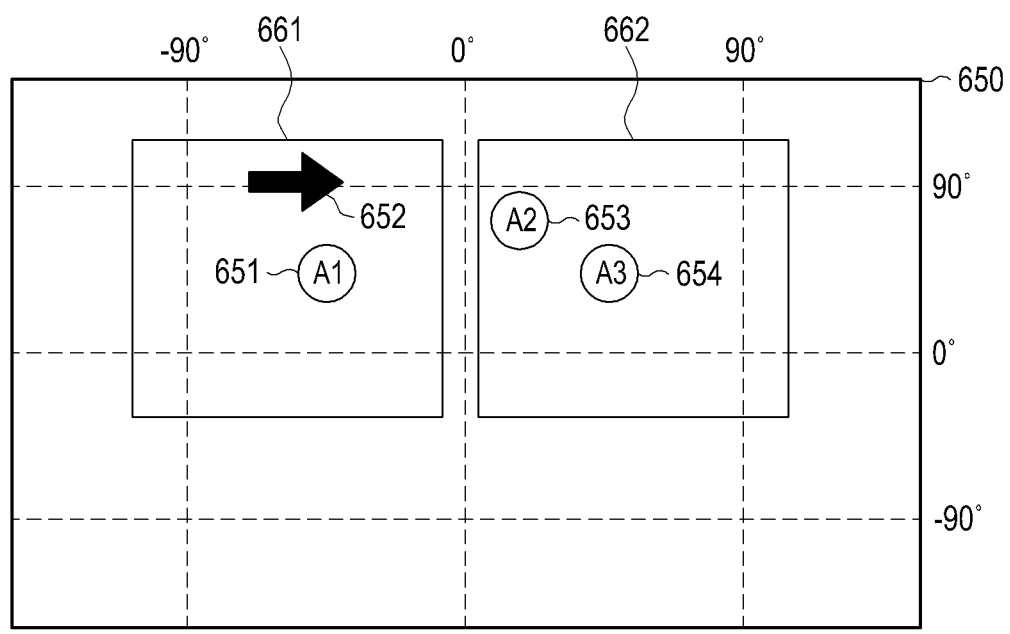
FIG. 6G is a diagram illustrating an example overall panoramic image according to an example embodiment of the present disclosure.

FIG. 6G is a diagram illustrating an example panoramic image according to an example embodiment of the present disclosure. Referring to FIG. 6G, the electronic device 101 may set a panoramic image 650 in an angular coordinate system. The panoramic image 650 set in the angular coordinate system may have a horizontal axis set at a first angle θ and a vertical axis set at a second angle φ.

The electronic device 101 may first display a first partial image 661 which is a first part of the panoramic image 650. The first partial image 661 may include a first graphical object 652 indicating the direction corresponding to the reference view information with respect to the first partial image 661 and the first object 651. For example, the electronic device 101 may display a left-eye image and right-eye image corresponding to the first partial image 661.

The electronic device 101 may sense a direction where the first side surface of the electronic device 101 faces and may determine a second partial image 662 corresponding to a change in the direction where the first side surface of the electronic device 101 faces. The electronic device 101 may change the first partial image 661 into the second partial image 662 corresponding to the change in the direction where the first side surface of the electronic device 101 faces and may display on the display 160. The second partial image 662 may include a second object 653 and a third object 654. The electronic device 101 may display a left-eye image and right-eye image corresponding to the second partial image 662.

Figure 7A:
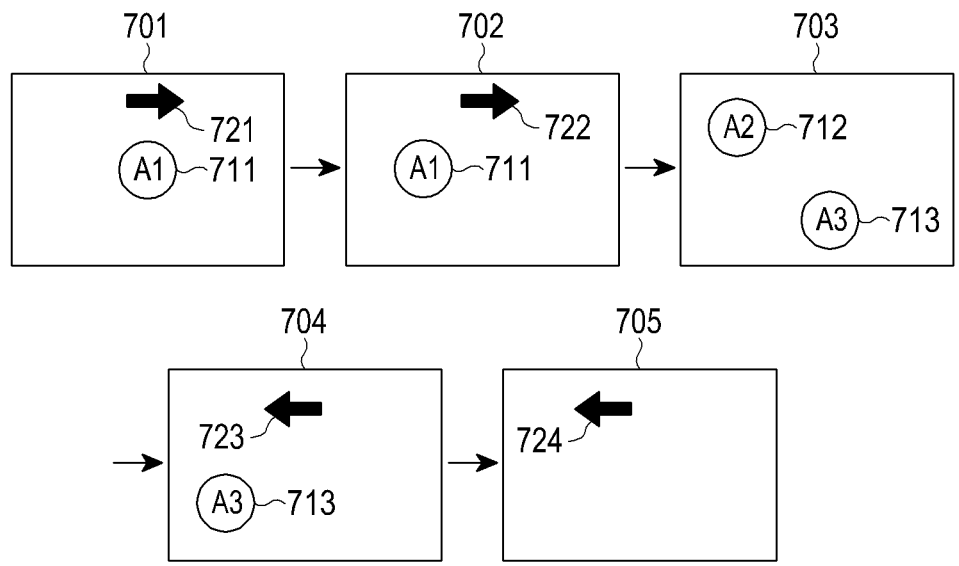
FIGS. 7A and 7B are diagrams illustrating an example partial image of a panoramic image displayed by an electronic device according to an example embodiment of the present disclosure.
Figure 7B:
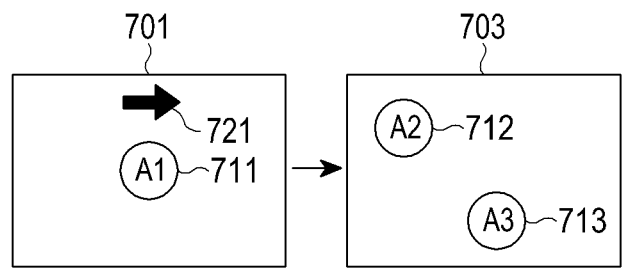

FIGS. 7A and 7B are diagrams illustrating an example partial image of a panoramic image displayed by an electronic device according to an example embodiment of the present disclosure.

A process in which partial images displayed on the display 160 are changed as the electronic device 101 moves is described below with reference to FIG. 7A. In FIG. 7A, a partial image corresponding to reference view information in a panoramic image is assumed to be a third partial image 703. Since the third partial image 703 corresponds to the reference view information, it may include only the second object 712 and third object 713.

The electronic device 101 may sense a direction of a first side surface of the electronic device 101 through a sensor and may display a first partial image 701 corresponding to the sensed direction of the first side surface of the electronic device 101. The first partial image 701 may include a first graphical object 721 indicating the direction for the reference view information with respect to the first partial image 701 and the first object 711.

The electronic device 101 may sense a change into the right direction of the direction of the first side surface of the electronic device 101 as the electronic device 101 moves to the right and may sequentially change the partial image displayed on the display 160 into the second partial image 702, the third partial image 703, the fourth partial image 704, and the fifth partial image 705 corresponding to the sensed change into the right direction of the direction of the first side surface of the electronic device 101. For example, the electronic device 101 may sequentially display a left-eye image and right-eye image corresponding to the plurality of partial images 701 to 705.

The second partial image 702 may include a first object 711 and a second graphical object 722, the fourth partial image 704 may include a third object 713 and a third graphical object 723, and the fifth partial image 705 may include a fourth graphical object 724.

When the electronic device 101 displays the first partial image 701 and the second partial image 702 on the display 160, the electronic device 101 may determine that the direction corresponding to the reference view information is a right direction with respect to the first partial image 701 and the second partial image 702 and may display the graphical objects 721 and 722 indicating the right direction.

Further, when the electronic device 101 displays the fourth partial image 704 and the fifth partial image 705 on the display 160, the electronic device 101 may determine that the direction corresponding to the reference view information is a left direction with respect to the fourth partial image 704 and the fifth partial image 705 and may display the graphical objects 723 and 724 indicating the left direction.

A process in which partial images displayed on the display 160 are changed even when the electronic device 101 does not move is described below with reference to FIG. 7B. The electronic device 101 may sense a direction of a first side surface of the electronic device 101 through a sensor and may display a first partial image 701 corresponding to the sensed direction of the first side surface of the electronic device 101. The first partial image 701 may include a first graphical object 721 indicating the direction for the reference view information with respect to the first partial image 701 and the first object 711.

Despite no motion of the electronic device 101, e.g., even when no change in the direction of the first side surface of the electronic device 101 is sensed, the electronic device 101 may change the image displayed on the display 160 into the third partial image 703 corresponding to the reference view information.

As the electronic device 101 identifies that the information regarding the first partial image 701 differs from the reference view information, the electronic device 101 may change the image displayed on the display 160 into the third partial image 703, and upon reception of a separate user input for changing images displayed on the display 160, the electronic device 101 may change the image displayed on the display 160 into the third partial image 703.

Figure 8A:
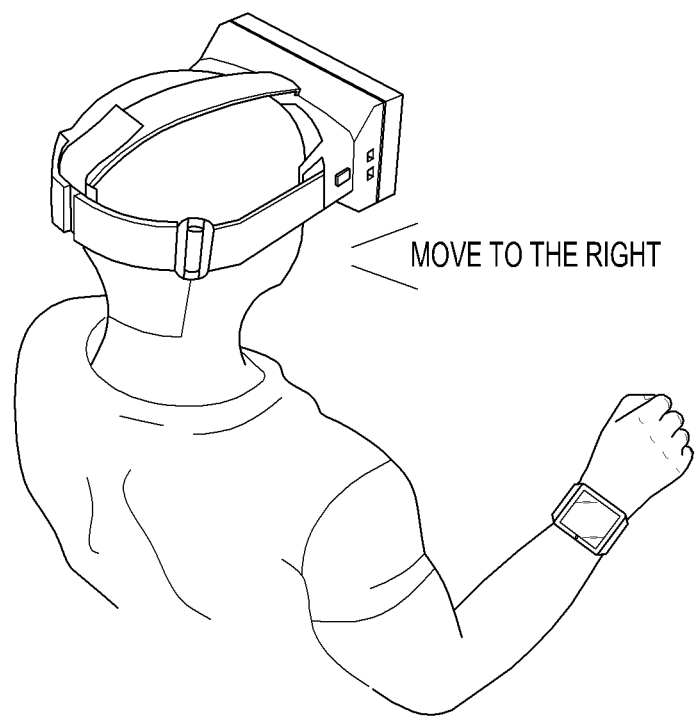
FIGS. 8A and 8B are diagrams illustrating an example method for providing information about a direction corresponding to reference view information by an electronic device according to an example embodiment of the present disclosure.
Figure 8B:

FIGS. 8A and 8B are diagrams illustrating an example method for providing information about a direction corresponding to reference view information by an electronic device according to an example embodiment of the present disclosure.

Referring to FIG. 8A, the electronic device 101 may output, through the input/output interface 150 (e.g., a speaker), a voice representing information about the direction corresponding to the reference view information with respect to the partial image displayed on the display 160. For example, the processor 120 may enable a voice, such as "move to the right," to be output and may also output the determined distance in voice.

Further, referring to FIG. 8B, the electronic device 101 may output a vibration based on information about the direction corresponding to the reference view information with respect to the partial image displayed on the display 160. For example, the processor 120 may output a vibration so that the user may sense the vibration on a right side, in order to notify the user that the determined direction is the right. The processor 120 may adjust the strength of the vibration to inform the user of the determined distance.

Figure 9:
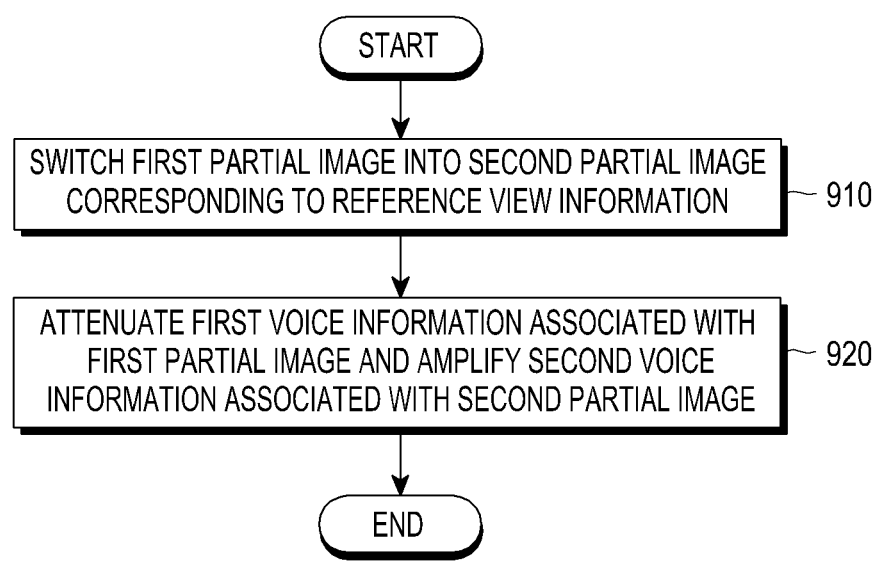
FIG. 9 is a flowchart illustrating an example method for varying a partial image of a panoramic image displayed to correspond to reference view information by an electronic device according to an example embodiment of the present disclosure.

FIG. 9 is a flowchart illustrating an example method for varying a partial image of a panoramic image displayed to correspond to reference view information by an electronic device according to an example embodiment of the present disclosure.

In operation 910, the electronic device 101 may switch a first partial image displayed on the display 160 into a second partial image corresponding to the reference view information. For example, upon sensing an event for varying images displayed, the processor 120 may enable a switch of the first partial image into the second partial image corresponding to the reference view information and enable the second partial image to be displayed on the display 160. Further, although not sensing a movement of the electronic device 101, the electronic device 101 may enable a switch from the first partial image to the second partial image.

In operation 920, when the image displayed switches from the first partial image to the second partial image, the electronic device 101 may attenuate first voice information associated with the first partial image while amplifying second voice information associated with the second partial image.

Figure 10A:
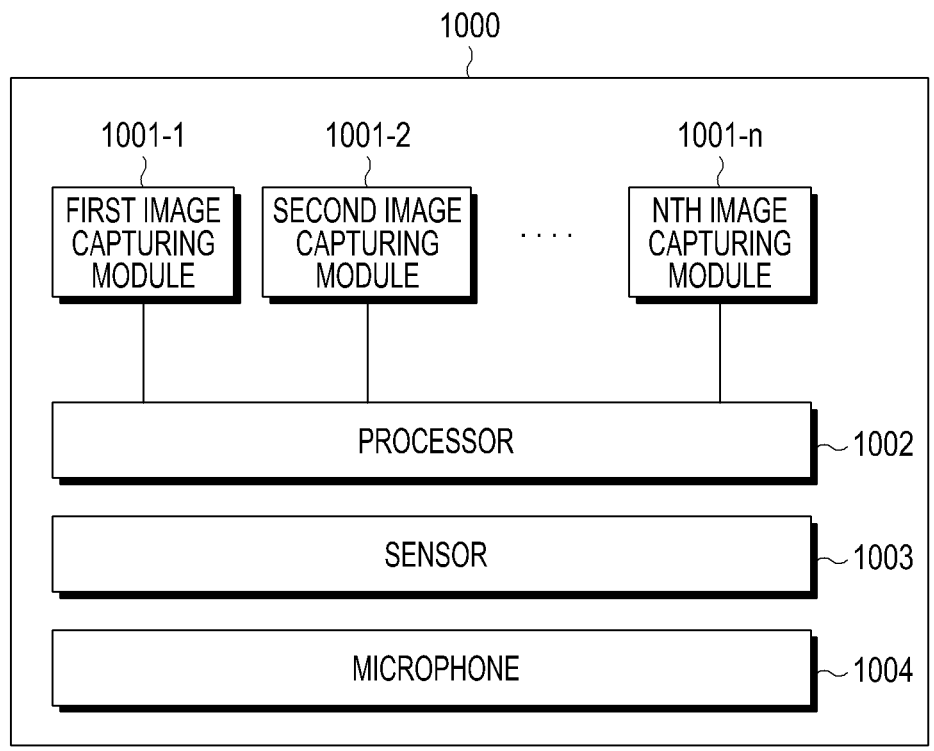
Figure 10B:
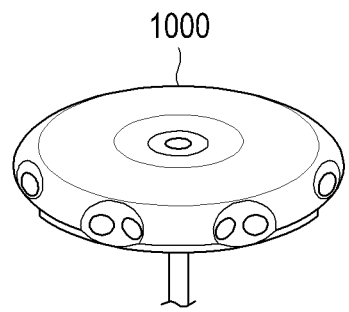
Figures 1, 10C:
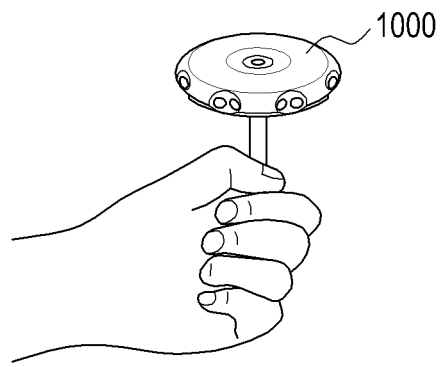
Figures 2, 10C:
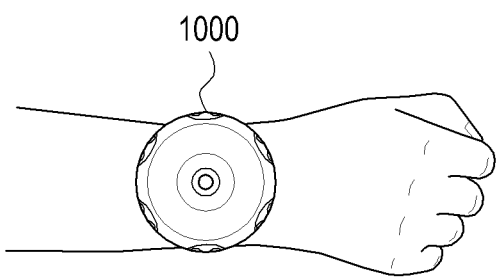

FIGS. 10A to 10C are diagrams illustrating an example electronic device according to an example embodiment of the present disclosure.

Referring to FIG. 10A, according to an example embodiment of the present disclosure, the electronic device 1000 may include a plurality of image capturing modules (e.g., including image capturing circuitry) 1001-1, 1001-2, . . . , and 1001-n, a processor (e.g., including processing circuitry) 1002, a sensor 1003, and at least one microphone 1004.

According to an example embodiment of the present disclosure, the plurality of image capturing modules 1001-1, 1001-2, . . . , and 1001-n may include various image capturing circuitry and be arranged to be spaced apart from each other so that their respective optical axes have different directions. As the plurality of image capturing modules 1001-1, 1001-2, . . . , and 1001-n are arranged to be spaced apart from each other so that their respective optical axes have different directions, the electronic device 1000 may image-capture an overall 3D space through the plurality of image capturing modules 1001-1, 1001-2, . . . , and 1001-n.

Further, as illustrated in FIG. 10B, the electronic device 1000 may, for example, be formed in a disc shape. However, this is provided merely as an example without limiting the present disclosure, and the electronic device 1000 may be formed in other various shapes. Further, depending on the shape of the electronic device 1000, the plurality of image capturing modules 1001-1, 1001-2, . . . , and 1001-n each may be arranged.

Figures 3, 10C:
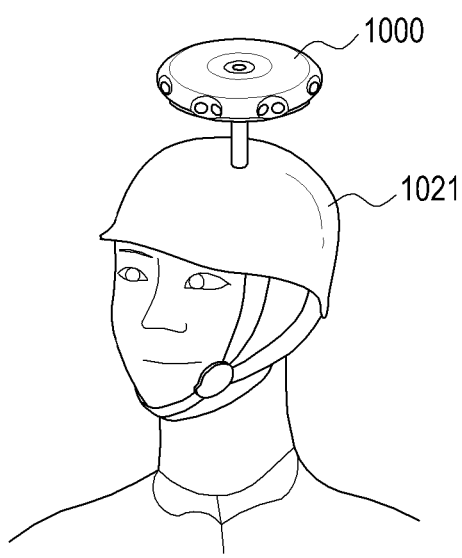
Figures 4, 10C:
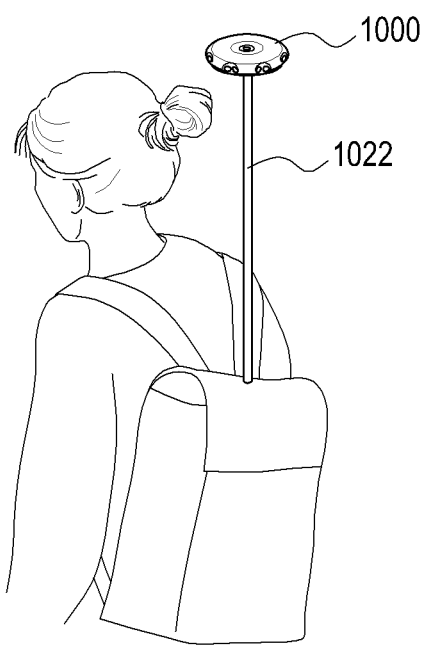
Figures 5, 10C:
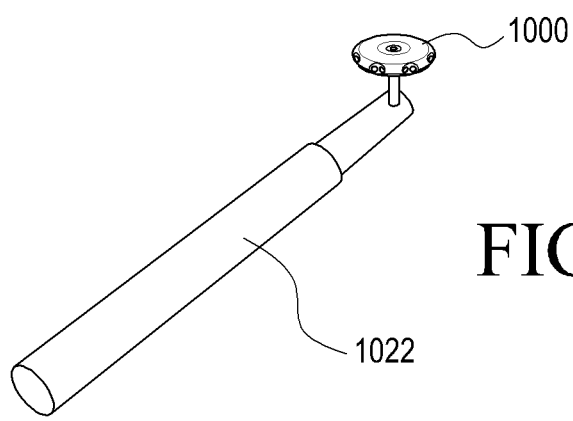

Further, as illustrated in FIG. 10C-1 to 10C-5, the electronic device 1000 may be used in various manners. For example, as illustrated in FIG. 10C-1, the user may capture an image of the space where he is positioned while holding the electronic device 1000 in his hand. Further, as illustrated in FIG. 10C-2, the user may also capture an image of the space where he is positioned while wearing the electronic device 1000 on his wrist. Further, as illustrated in FIG. 10C-3, the user may capture an image of the space where he is positioned while wearing a helmet for holding the electronic device 1000, or as illustrated in FIGS. 10C-4 and 10C-5, the user may capture an image of the space where he is positioned with a mount 1022 for holding the electronic device 1000 installed on the bag or while the user holds the mount 1022.

According to an example embodiment of the present disclosure, the processor 1002 may obtain a plurality of images through the plurality of image capturing modules 1001-1, 1001-2, . . . , and 1001-n. Since the plurality of image capturing modules 1001-1, 1001-2, . . . , and 1001-n are arranged to be spaced apart from each other so that their respective optical axes have different directions, the plurality of images obtained through the plurality of image capturing modules 1001-1, 1001-2, . . . , and 1001-n may be images captured for different directions in the space.

According to an example embodiment of the present disclosure, the processor 1002 may generate reference view information indicating view information that serves as a reference for a panoramic image for the panoramic image generated using the plurality of images. The processor 1002 may insert the generated reference view information into information related to the panoramic image.

The reference view of the panoramic image may be a view including a portion that the producer of the panoramic image desires to show or a view including a portion that the user desires to view from the panoramic image. The reference view information may be information indicating the position or direction of the reference view of the panoramic image. For example, the reference view information may include at least one of coordinate information or direction information regarding the reference view of the panoramic image or information about an image capturing module that has obtained the image including the reference view of the panoramic image.

The processor 1002 may generate the reference view information at each time of obtaining the plurality of images through the plurality of image capturing modules 1001-1, 1001-2, . . . , and 1001-n. Further, the processor 1002 may generate the reference view information at each period previously set and may generate the reference view information at each frame of the plurality of images. The processor 1002 may insert the generated reference view information into the information related to the panoramic image in association with the time of generating the reference view information.

For example, the processor 1002 may sense a direction where the first side surface of the electronic device 1001 faces through the sensor 1003 and may generate the reference view information using information about a first partial image of the panoramic image corresponding to the sensed direction where the first side surface of the electronic device faces. The user may generate the reference view information in real-time. The user may set the first side surface of the electronic device 1000 as a reference surface for generating the reference view information and may sense the direction in which the first side surface faces and use the same to generate the reference view information.

Further, the processor 1002 may generate the reference view information using the information about the first partial image of the panoramic image corresponding to an image obtained through a preset first image capturing module to generate the reference view information among the plurality of image capturing modules 1001-1, 1001-2, . . . , and 1001-n. The user may set the first image capturing module as a reference image capturing module for generating reference view information and may generate reference view information using an image obtained through the first image capturing module.

Further, the processor 1002 may identify the first partial image of the panoramic image including a predesignated target object to generate reference view information and may generate the reference view information using information about the first partial image. The user may designate a target object to generate reference view information, and the processor 1002 may trace the object in the panoramic image to identify the first partial image including the target object. The processor 1002 may generate the reference view information using the first partial image including the target object.

Further, the processor 1002 may identify the first partial image of the panoramic image corresponding to an input received from the user and may generate the reference view information using the information about the first partial image. The user input may be received in real-time at the time of capturing the plurality of images through the plurality of image capturing modules 1001-1, 1001-2, . . . , and 1001-n or may be received after the panoramic image has been generated.

According to an example embodiment of the present disclosure, the processor 1002 may generate the reference view information using the information about the first partial image identified through the various methods described above. For example, the processor 1002 may generate the reference view information to include at least one of the coordinate information regarding the first partial image, the information about at least one image capturing module having obtained at least one image including the first partial image, and direction information regarding the first partial image.

According to an example embodiment of the present disclosure, the panoramic image may include a left-eye panoramic image and a right-eye panoramic image to provide a VR service, and the processor 1002 may generate each of the left-eye panoramic image and right-eye panoramic image using the plurality of images obtained through the plurality of image capturing modules 1001-1, 1001-2, . . . , and 1001-n.

According to an example embodiment of the present disclosure, the processor 1002 may obtain voice information associated with each of the plurality of images through at least one microphone 1004. The processor 1002 may generate voice information regarding the panoramic image to correspond to each of the plurality of images upon generating the panoramic image using the voice information obtained through at least one microphone 1004.

Figure 11:
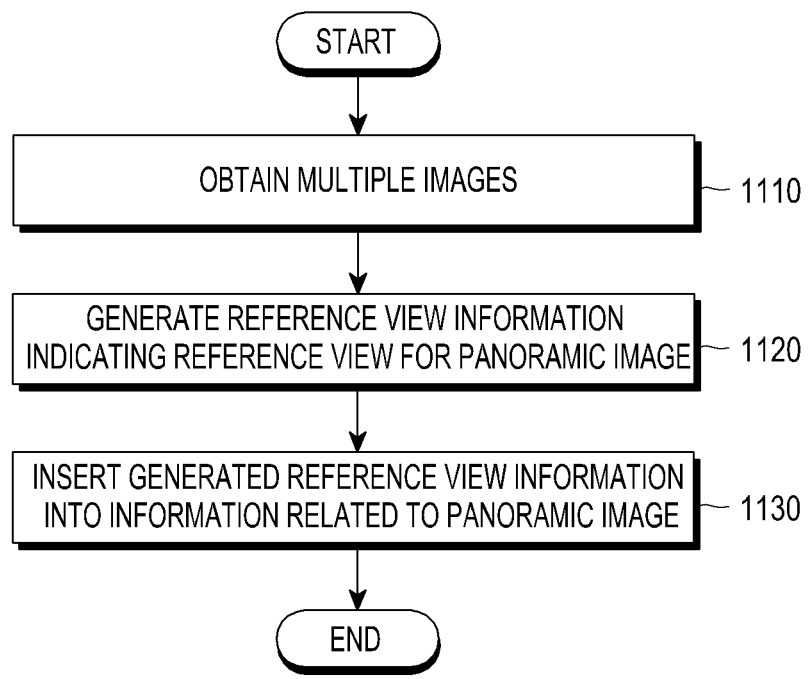
FIG. 11 is a flowchart illustrating an example method for generating a panoramic image by an electronic device according to an example embodiment of the present disclosure.

FIG. 11 is a flowchart illustrating an example method for generating a panoramic image by an electronic device according to an example embodiment of the present disclosure.

In operation 1110, the electronic device 1000 may obtain a plurality of images through the plurality of image capturing modules 1001-1, 1001-2, . . . , and 1001-n. Since the plurality of image capturing modules 1001-1, 1001-2, . . . , and 1001-n are arranged to be spaced apart from each other so that their respective optical axes have different directions, the plurality of images obtained through the plurality of image capturing modules 1001-1, 1001-2, . . . , and 1001-n may be images captured for different directions in the space.

In operation 1120, the electronic device 1000 may generate reference view information indicating view information that serves as a reference for a panoramic image for the panoramic image generated using the plurality of images. The electronic device 1000 may generate the reference view information at each time of obtaining the plurality of images through the plurality of image capturing modules 1001-1, 1001-2, . . . , and 1001-n.

Further, the electronic device 1000 may receive a plurality of images from a device positioned outside the electronic device 1000 and may also generate reference view information for a panoramic image generated using the plurality of images received.

In operation 1130, the electronic device 1000 may insert the generated reference view information into information related to the panoramic image. The information related to the panoramic image may be, e.g., metadata for the panoramic image, and the reference view information may be inserted into the metadata for the panoramic image.

FIGS. 12A to 12D are flowcharts illustrating an example method for generating reference view information according to an example embodiment of the present disclosure.

Figure 12A:
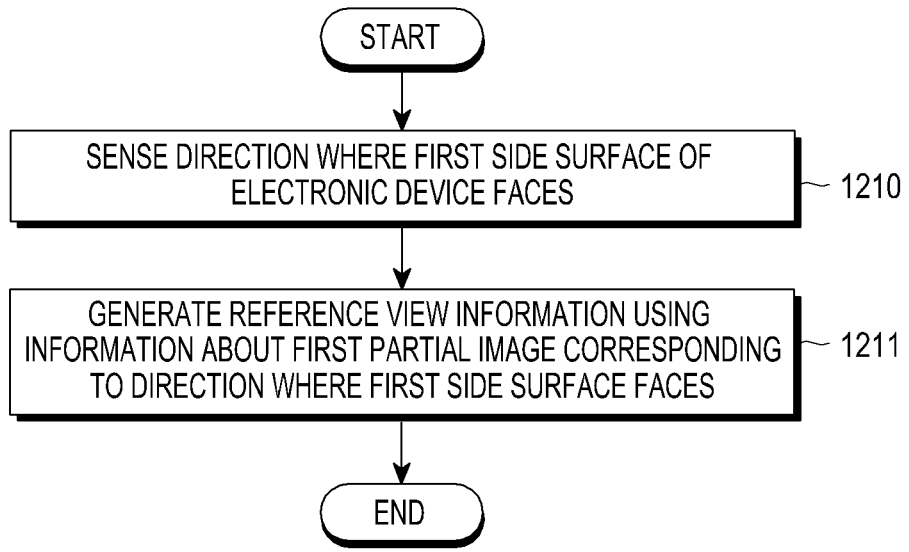
FIGS. 12A, 12B, 12C and 12D are flowcharts illustrating an example method for generating reference view information according to an example embodiment of the present disclosure.

Referring to FIG. 12A, in operation 1210, the electronic device 1000 may sense a direction in which a first side surface of the electronic device 1000 faces through a sensor 1003. The user may set the first side surface of the electronic device 1000 as a reference surface for generating the reference view information and may sense the direction in which the first side surface faces and use the same to generate the reference view information.

Figure 13A:
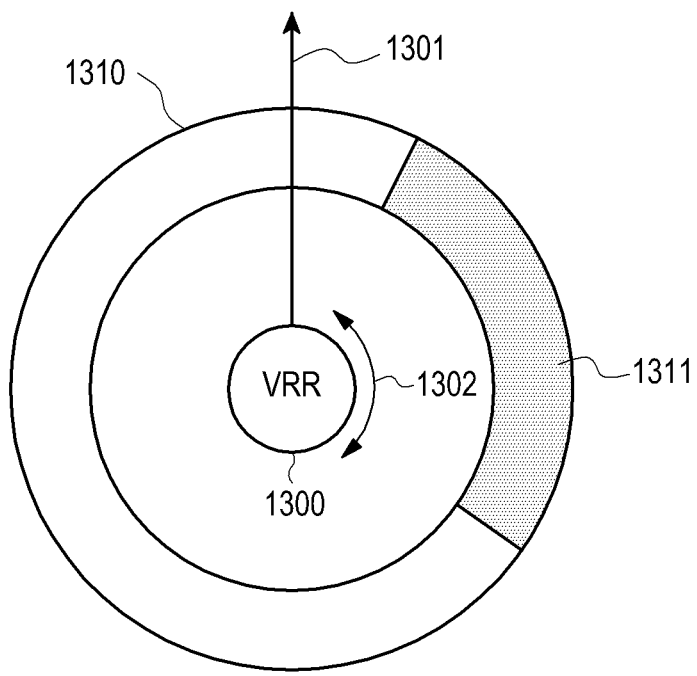

Referring to FIG. 13A, the user may obtain a plurality of images through the plurality of image capturing modules 1001-1, 1001-2, . . . , and 1001-n while moving the electronic device 1000 in a first direction 1301. The electronic device 1000 may generate a panoramic image 1310 representing an overall space using the plurality of images obtained. The electronic device 1000 may sense the direction in which the first side surface 1302 of the electronic device 1000 faces through the sensor 1003.

In operation 1211, the electronic device 1000 may generate reference view information indicating a view serving as a reference for the panoramic image 1310 using information about the first partial image 1311 of the panoramic image 1310 corresponding to the sensed direction where the first side surface 1302 of the electronic device 1000 faces.

For example, the electronic device 1000 may generate the reference view information to include at least one of the coordinate information regarding the first partial image 1311, the information about at least one image capturing module having obtained at least one image including the first partial image 1311, and direction information regarding the first partial image 1311.

Figure 12B:
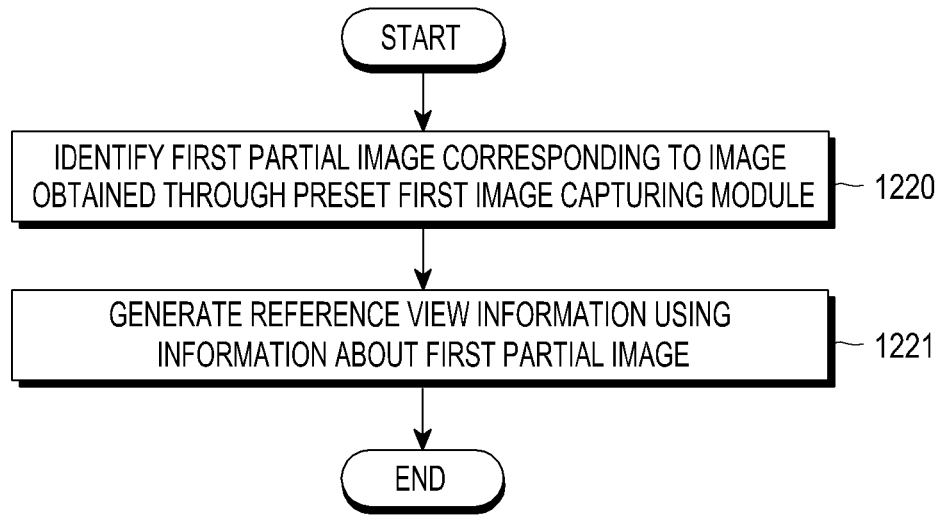

Referring to FIG. 12B, in operation 1220, the electronic device 1000 may identify the first partial image of the panoramic image corresponding to the image obtained through a preset first image capturing module of the plurality of image capturing modules 1001-1, 1001-2, . . . , and 1001-n.

Figures 1, 13B:
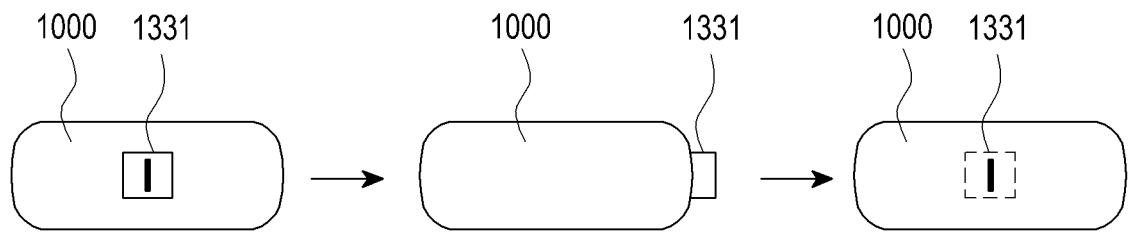
Figures 2, 13B:
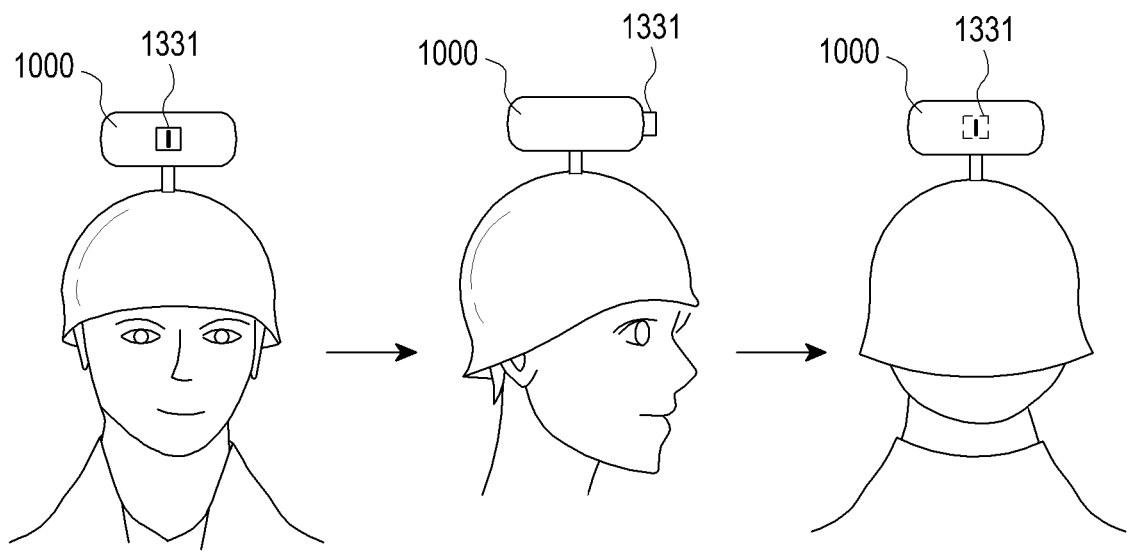

Referring to FIGS. 13B-1 and 13B-2, the first image capturing module 1331 may be set as an image capturing module having coordinates previously set with respect to the center of the electronic device 1000 among the plurality of image capturing modules 1001-1, 1001-2, . . . , and 1001-n. For example, the image capturing module present at the coordinates (x1,y1,z1) with respect to the center of the electronic device 1000 may be set as the first image capturing module 1331. Accordingly, when the electronic device 1000 rotates, the respective coordinates of the plurality of image capturing modules 1001-1, 1001-2, . . . , and 1001-n are varied in real-time, and thus, the image capturing module set as the first image capturing module 1331 among the plurality of image capturing modules 1001-1, 1001-2, . . . , and 1001-$n$ may also be varied in real-time.

Further, the first image capturing module 1331 may be set as a particular image capturing module among the plurality of image capturing modules 1001-1, 1001-2, . . . , and 1001-$n$. For example, among the plurality of image capturing modules 1001-1, 1001-2, . . . , and 1001-$n$, a number-one image capturing module 1001-1 may be set as the first image capturing module 1331. In this example, even when the electronic device 1000 itself turns around as illustrated in FIG. 13B-1 or the electronic device 1000 rotates as the user wearing the helmet 1332 for holding the electronic device 1000 turns his head, the number-one image capturing module 1001-1 may remain the first image capturing module 1331.

In operation 1221, the electronic device 1000 may generate reference view information regarding the panoramic image using information about the first partial image identified.

For example, the electronic device 100 may generate the reference view information to include at least one of the coordinate information regarding the first partial image, the information about at least one image capturing module having obtained at least one image including the first partial image, and direction information regarding the first partial image.

Figure 12C:
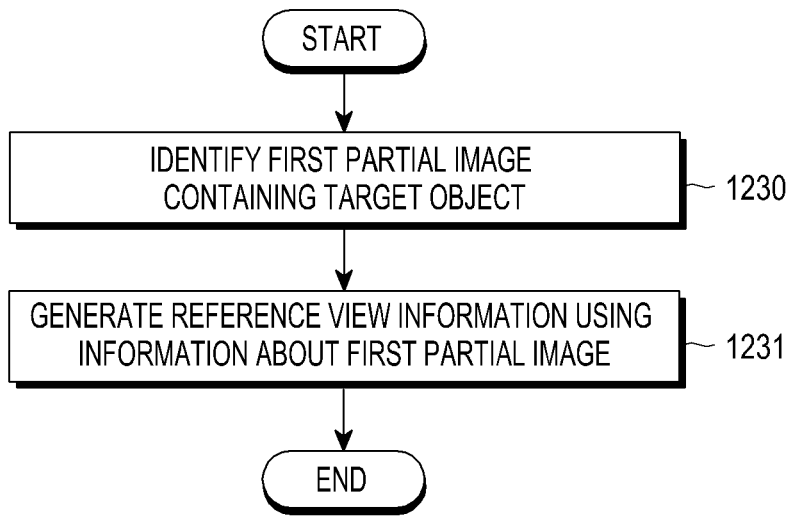

Referring to FIG. 12C, in operation 1230, the electronic device 1000 may identify the first partial image of the panoramic image including a predesignated target object.

Figure 13C:
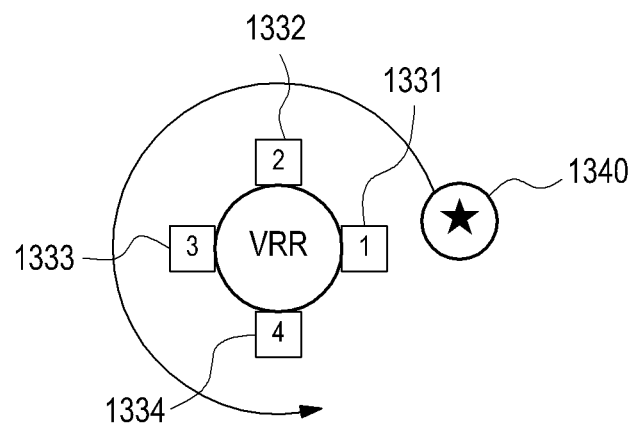

FIG. 13C illustrates an example in which the target object 1340 rotates counterclockwise. At the first position, the target object 1340 may be identified from a first image obtained through the number-one image capturing module 1331. Thereafter, as the target object 1340 moves counterclockwise, the target object may sequentially be identified as a second image obtained through the number-two image capturing module 1332, a third image obtained through the number-three image capturing module 1333, and a fourth image obtained through the number-four image capturing module 1334.

Accordingly, the first partial image may sequentially be changed into the first image to the fourth image.

In operation 1231, the electronic device 100 may generate reference view information regarding the panoramic image using information about the first partial image identified.

For example, the electronic device 100 may generate the reference view information to include at least one of the coordinate information regarding the first partial image, the information about at least one image capturing module having obtained at least one image including the first partial image, and direction information regarding the first partial image.

Figure 12D:
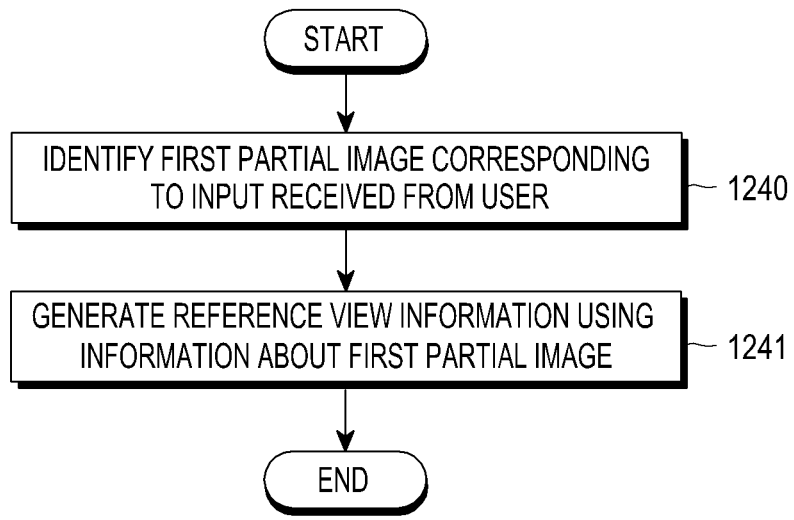

Referring to FIG. 12D, in operation 1240, the electronic device 1000 may identify the first partial image of the panoramic image corresponding to an input received from the user. The user may designate the first partial image through an input device of the electronic device 1000 for generating reference view information. The electronic device 1000 may identify the first partial image of the panoramic image as per the input received through the input device.

Figure 14:
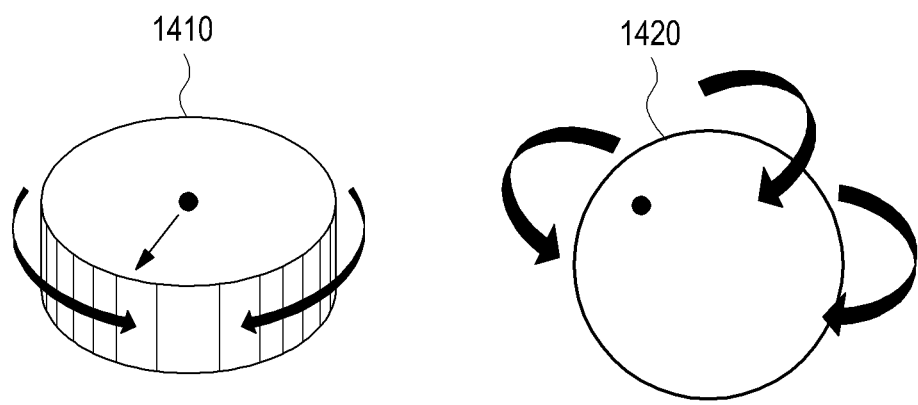
FIG. 14 is a diagram illustrating an example input device for generating reference view information according to an example embodiment of the present disclosure.

Referring to FIG. 14, the input device of the electronic device 1000 for generating reference view information may be configured as a device 1410 rotatable to the left or right, such as a jog shuttle, or as a spherical device 1420 designed to enable rotation in all directions. However, this is provided merely for illustration purposes, and example embodiments of the present disclosure are not limited thereto. For example, various input devices supportable by the electronic device 1000 may be used to generate reference view information.

In operation 1241, the electronic device 1000 may generate reference view information regarding the panoramic image using information about the first partial image identified.

For example, the electronic device 1000 may generate the reference view information to include at least one of the coordinate information regarding the first partial image, the information about at least one image capturing module having obtained at least one image including the first partial image, and direction information regarding the first partial image.

Further, the electronic device 1000 may send, in real-time, a plurality of images obtained through the plurality of image capturing modules 1001-1, 1001-2, . . . , and 1001-$n$ to the electronic device 101. The user of the electronic device 101 may move the electronic device 101 after viewing the plurality of images received. Reference view information may be generated according to the movement of the electronic device 101.

For example, when the user of the electronic device 101 moves the electronic device 101 in a first direction, the image corresponding to the first direction among the plurality of images received may be identified as the first partial image of the panoramic image. Information about the first partial image identified based on the movement of the electronic device 101 may be sent back to the electronic device 1000, and the electronic device 1000 may generate reference view information using the received information about the first partial image. Further, the electronic device 101 may generate reference view information on its own and may send the generated reference view information to the electronic device 1000.

Figure 15A:
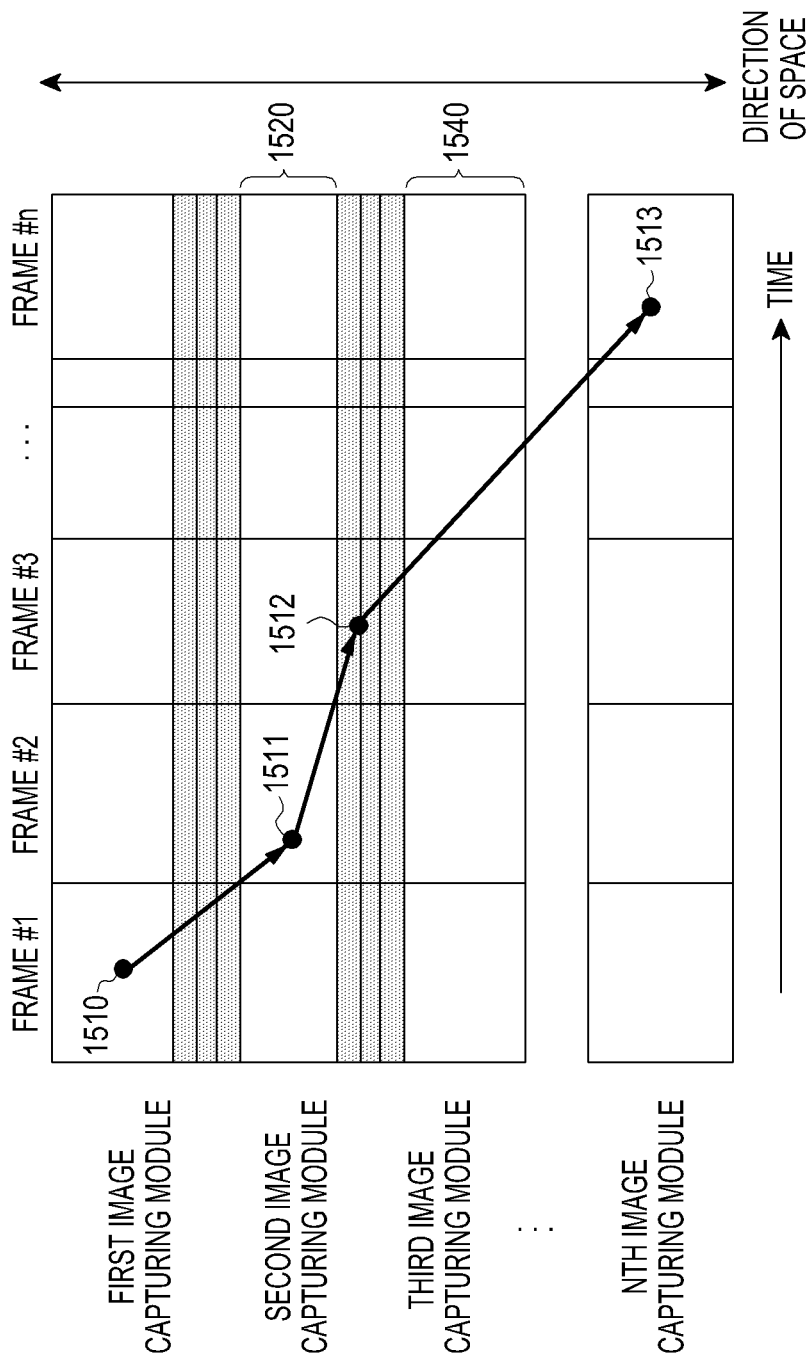
FIGS. 15A, 15B and 15C are views illustrating an example method for generating reference view information according to an example embodiment of the present disclosure.
Figure 15B:
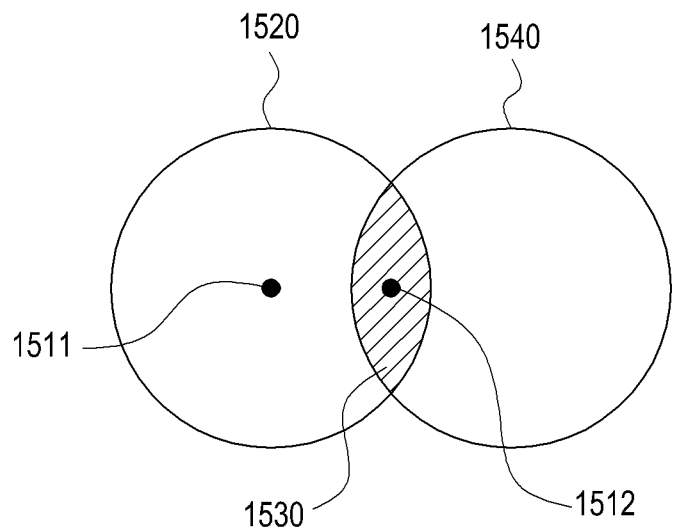
Figure 15C:
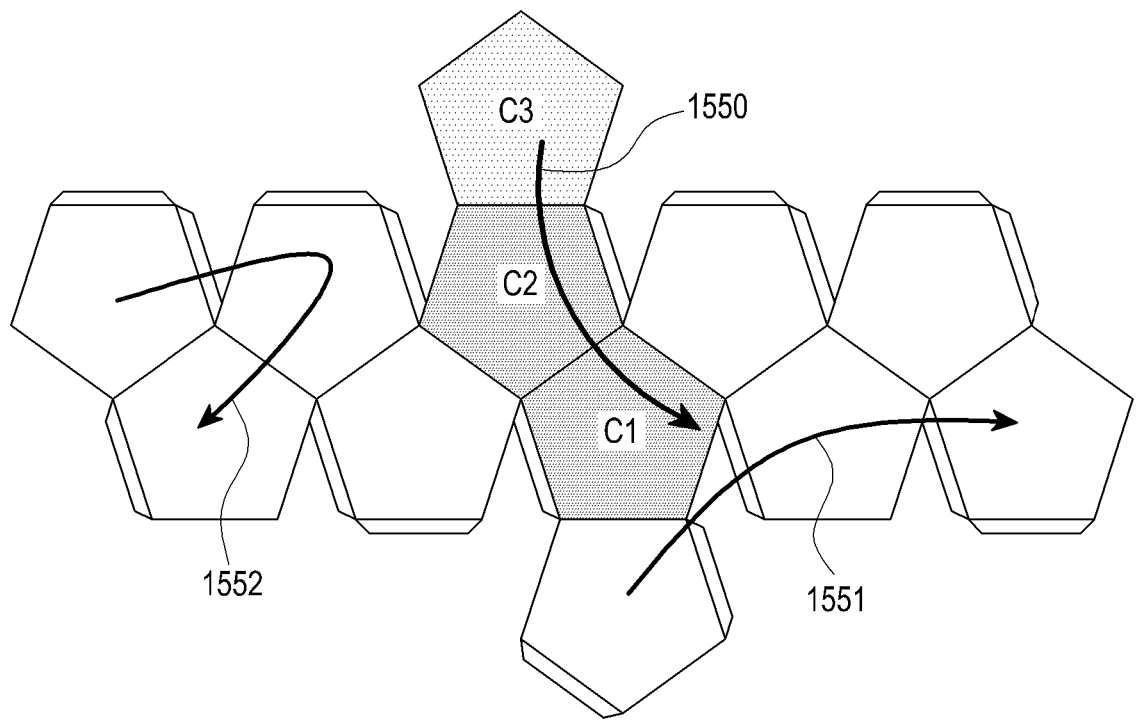

FIGS. 15A, 15B and 15C are diagrams illustrating an example method for generating reference view information according to an example embodiment of the present disclosure.

According to an example embodiment of the present disclosure, reference view information regarding a panoramic image may be generated at each time of obtaining a plurality of images. For example, reference view information may be generated per frame of the plurality of images.

Referring to FIG. 15A, at a first frame, reference view information 1510 may be generated for a first image obtained through a number-one image capturing module, and at a second frame, reference view information 1511 may be generated for a second image obtained through a number-two image capturing module. Further, at a third frame, reference view information 1512 may be generated for where an image obtained through the number-two image capturing module overlaps an image obtained through a number-three image capturing module. At a nth frame, reference view information 1513 may be generated for an image obtained through a number-n image capturing module.

Since a panoramic image is generated through a plurality of images, the plurality of images may overlap. For example, the number-two image may include a portion 1520 not overlapping other images and a portion 1530 overlapping an adjacent image capturing module. The number-three image may also include a portion 1540 not overlapping other images and a portion 1530 overlapping an adjacent image capturing module.

Referring to FIG. 15B, the reference view information 1512 may also be generated from the portion 1530 where images overlap. The reference view information 1512 generated in the portion 1530 where images overlap may include information about the image capturing module having obtained each of the overlapping images. For example, the reference view information 1512 may include all of the information about the number-two image capturing module and information about the number-three image capturing module.

The above-described reference view information 1510, 1511, 1512, and 1513 may be inserted into information related to the panoramic image in association with the times of obtaining the plurality of images or times of generating the reference view information 1510, 1511, 1512, and 1513 such as frame numbers.

For example, when reference view information is configured with information about the image capturing modules, the reference view information may be inserted into information related to the panoramic image in association with frame numbers, such as (f1, number-one image capturing module), (f2, number-two image capturing module), (F3, number-two and number-three image capturing module), and (fn, number-n image capturing module). For example, f1, f2, f3, and fn, respectively, denote the first, second, third, and the nth frame.

Further, when the reference view information may be configured with coordinate information, the reference view information may be inserted into the information related to the panoramic image in association with the times of obtaining the images, such as (t1, (x1, y1, z1)), (t2, (x2, y2, z2)), (t3, (x3, y3, z3)), and (tn, (xn, yn, zn)). For example, t1, t2, t3, and tn, respectively, denote the times of obtaining the images.

FIG. 15C is a diagram illustrating an example in which reference view information is varied based on times of obtaining images in a 3D panoramic image representing an overall space. The 3D panoramic image may be displayed in two dimension (2D) as illustrated in FIG. 15C. The user may set reference view information indicating a reference view of the panoramic image at the time of obtaining the panoramic image while varying it along a first direction 1550. For example, the user may sequentially change the images from the third image corresponding to the number-three image capturing module to the second image corresponding to the number-two image capturing module and the first image corresponding to the number-one image capturing module.

Further, the user may vary and set the reference view information in the second direction 1551 and third direction 1552 as he desires.

Figure 16A:
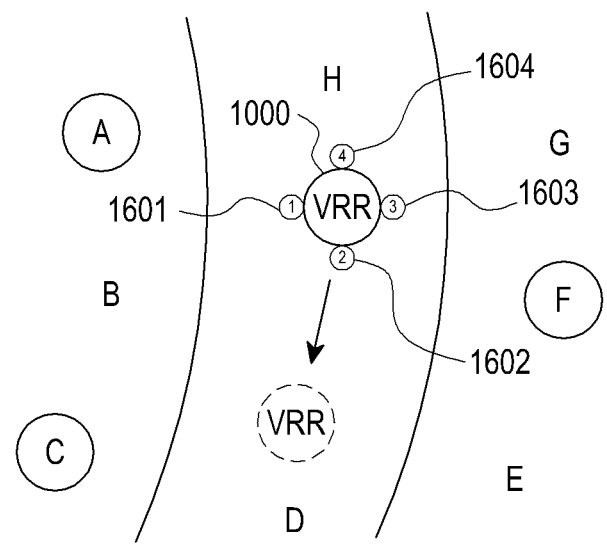
FIGS. 16A and 16B are diagrams illustrating an example method for generating reference view information by a single electronic device according to an example embodiment of the present disclosure.
Figure 16B:
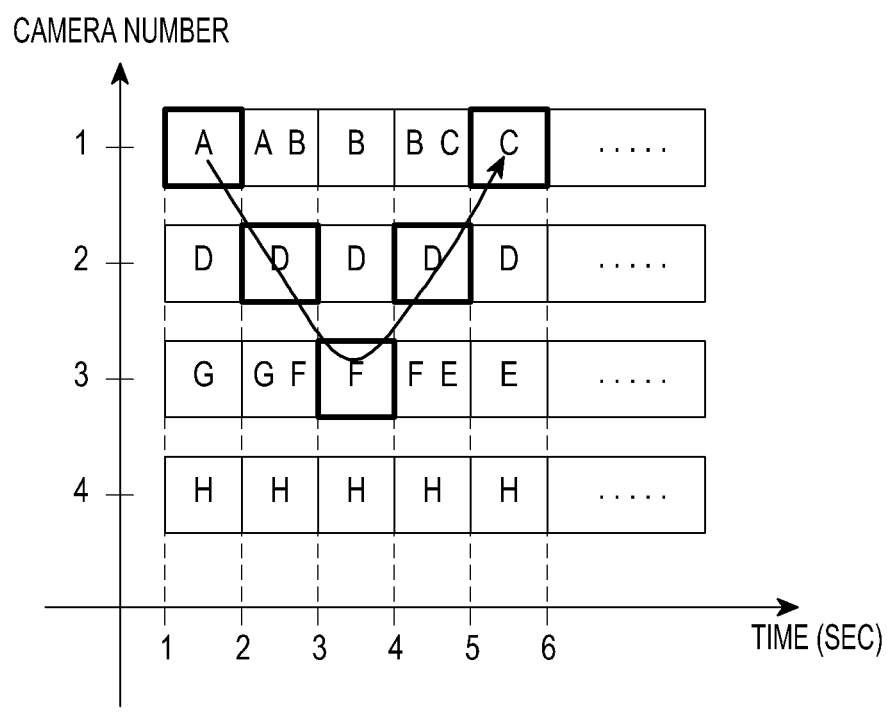

FIGS. 16A and 16B are diagrams illustrating an example method for generating reference view information by a single electronic device according to an example embodiment of the present disclosure.

Described with reference to FIG. 16A is a method for generating reference view information when one electronic device 1000 moves towards a point D, and the user desires to sequentially show a point A, point F, and point C in a panoramic image.

Since the image capturing modules 1601, 1602, 1603, and 1604 are oriented in fixed directions, the image obtained through each of the image capturing modules 1601, 1602, 1603, and 1604 is varied, as illustrated in FIG. 16*b*, as the electronic device 1000 moves.

Referring to FIG. 16B, as the electronic device 1000 moves, the number-one image capturing module 1601 sequentially image-captures points A, B, and C, and the number-three image capturing module 1603 sequentially image-captures points G, F, and E. Although the electronic device 1000 moves, the number-two image capturing module 1602 keeps image-capturing point D, and the number-four image capturing module 1604 keeps image-capturing point H.

As set forth above, when the user attempts to sequentially show points A, F, and C in the panoramic image, the electronic device 1000 may generate first reference view information to correspond to an image captured through the number-one image capturing module 1601 at a one-second time to show point A, generate third reference view information to correspond to an image captured through the number-three image capturing module 1603 at a three-second time to show point F, and generate fifth reference view information to correspond to an image captured through the number-one image capturing module 1601 at a five-second time to show point C. Further, the electronic device 1000 may generate second and fourth reference view information to correspond to images captured through the number-two image capturing module 1602 at two-second and four-second times so that the images respectively showing the points can be naturally switched.

As such, when the user desires to sequentially show particular points in the panoramic image, the electronic device 1000 may generate reference view information to correspond to images containing the particular points.

Figure 16C:
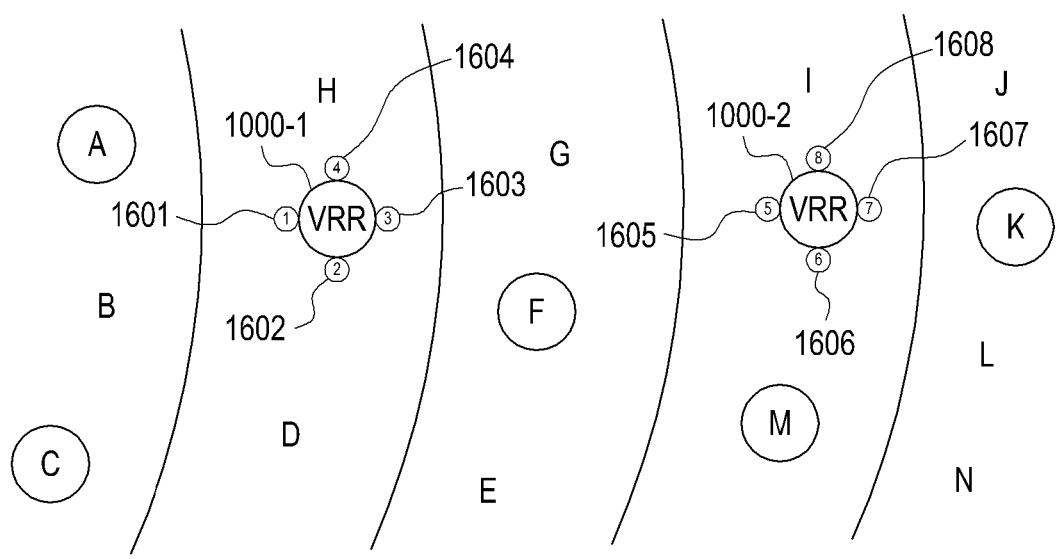
FIGS. 16C and 16D are diagrams illustrating an example method for generating reference view information by multiple electronic devices according to an example embodiment of the present disclosure.
Figure 16D:
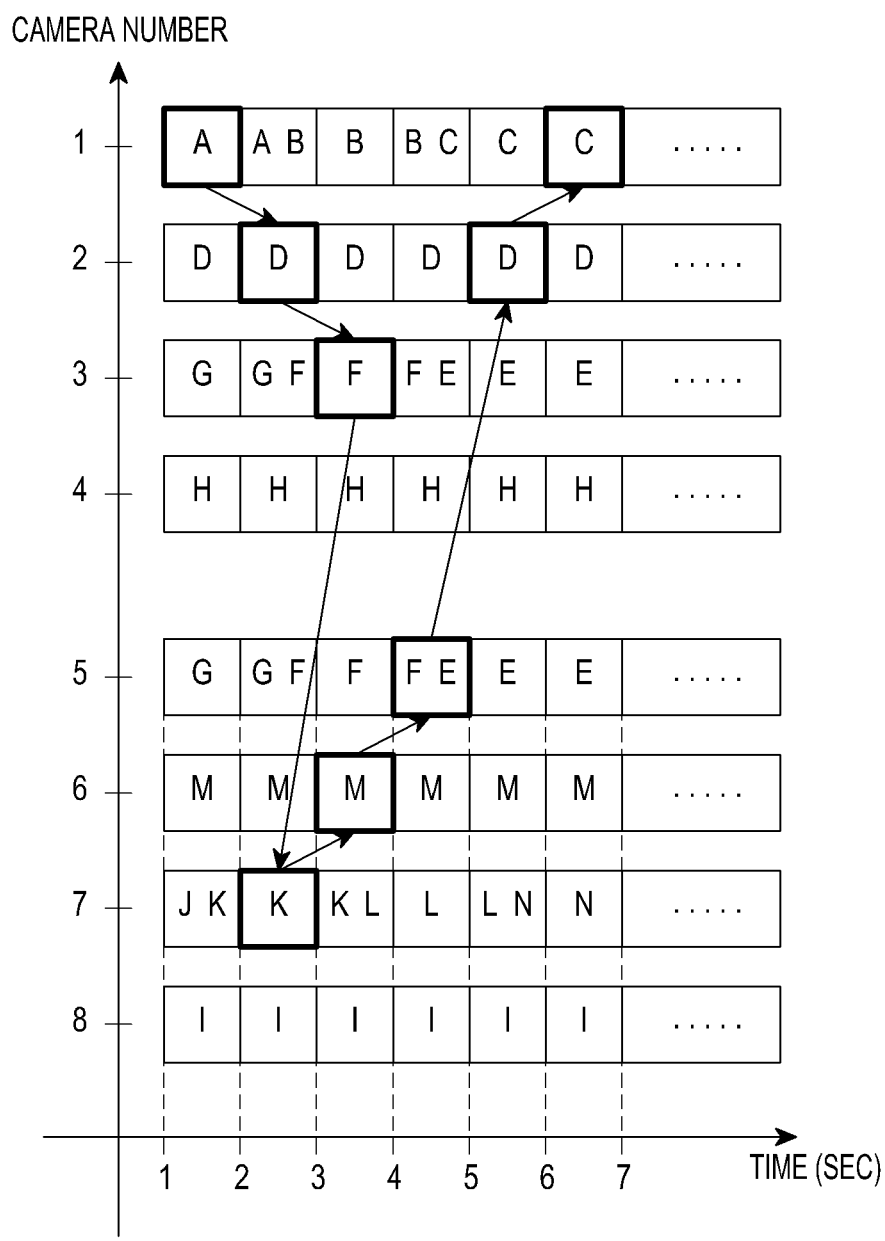

FIGS. 16C and 16D are diagrams illustrating an example method for generating reference view information by multiple electronic devices according to an example embodiment of the present disclosure.

Described with reference to FIG. 16C is a method for generating reference view information when two electronic devices 1000-1 and 1000-2, respectively, move towards points D and M, and the user desires to show points A, F, K, M, and C in a panoramic image. In examples illustrated in FIGS. 16C and 16D, as opposed to the examples illustrated in FIGS. 16A and 16B, images obtained through the second electronic device 1000-2 may be used to show points K and M which are difficult to image-capture through the first electronic device 1000-1.

Referring to FIG. 16D, as the first electronic device 1000-1 moves, the number-one image capturing module 1601 sequentially captures images from point A through point B to point C, and the number-three image capturing module 1603 sequentially captures images from point G through point F to point E. Although the first electronic device 1000-1 moves, the number-four image capturing module 1604 keeps image-capturing point H, and the number-two image capturing module 1602 keeps image-capturing point D.

Also, as the second electronic device 1000-2 moves, the number-five image capturing module 1605 sequentially image-captures points G, F, and E, and the number-seven image capturing module 1607 sequentially image-captures points J, K, L, and N. Although the second electronic device 1000-2 moves, the number-six image capturing module 1606 keeps image-capturing point M, and the number-eight image capturing module 1608 keeps image-capturing point I.

As set forth above, when the user attempts to sequentially show points A, F, K, M, and C in the panoramic image, the first electronic device 1000-1 may generate first reference view information to correspond to an image captured through the number-one image capturing module 1601 at a one-second time to show point A and generate third reference view information to correspond to an image captured through the number-three image capturing module 1603 at a three-second time to show point F. Further, the first electronic device 1000-1 may generate second reference view information to correspond to an image captured through the number-two image capturing module 1602 at a two-second time so that the images respectively showing points A and F can be naturally switched.

Further, the second electronic device 1000-2 may generate fourth reference view information to correspond to an image captured through the number-seven image capturing module 1607 at a two-second time to show point K.

The fourth reference view information may be generated to correspond to an image captured through the number-seven image capturing module 1607 at a two-second time that comes ahead of the three-second time when the third reference view information is generated. To show point K, the second electronic device 1000-2—since the image obtained by image-capturing only point K through the number-seven image capturing module 1607 is obtained at the two-second time—may generate the fourth reference view information to correspond to the image at the two-second time that comes ahead of the time when the third reference view information is generated.

As such, reference view information might be not always sequentially generated as times go by. A plurality of reference view information may be set at the same time to show a particular point. The order of generating reference view information may be set to go opposite the time elapse.

The user may generate fifth reference view information to correspond to an image captured through the number-six image capturing module 1606 at the three-second time to show point M. Further, the user may generate eighth reference view information to correspond to an image captured through the number-one image capturing module 1601 at a six-second time to show point C. Further, for a smooth transition from the image showing point M to the image showing point C, the user may generate sixth reference view information to correspond to an image captured through the number-five image capturing module 1605 or number-three image capturing module 1603 at the four-second time and generate seventh reference view information to correspond to an image captured through the number-two image capturing module 1602 at the five-second time.

Figure 17:
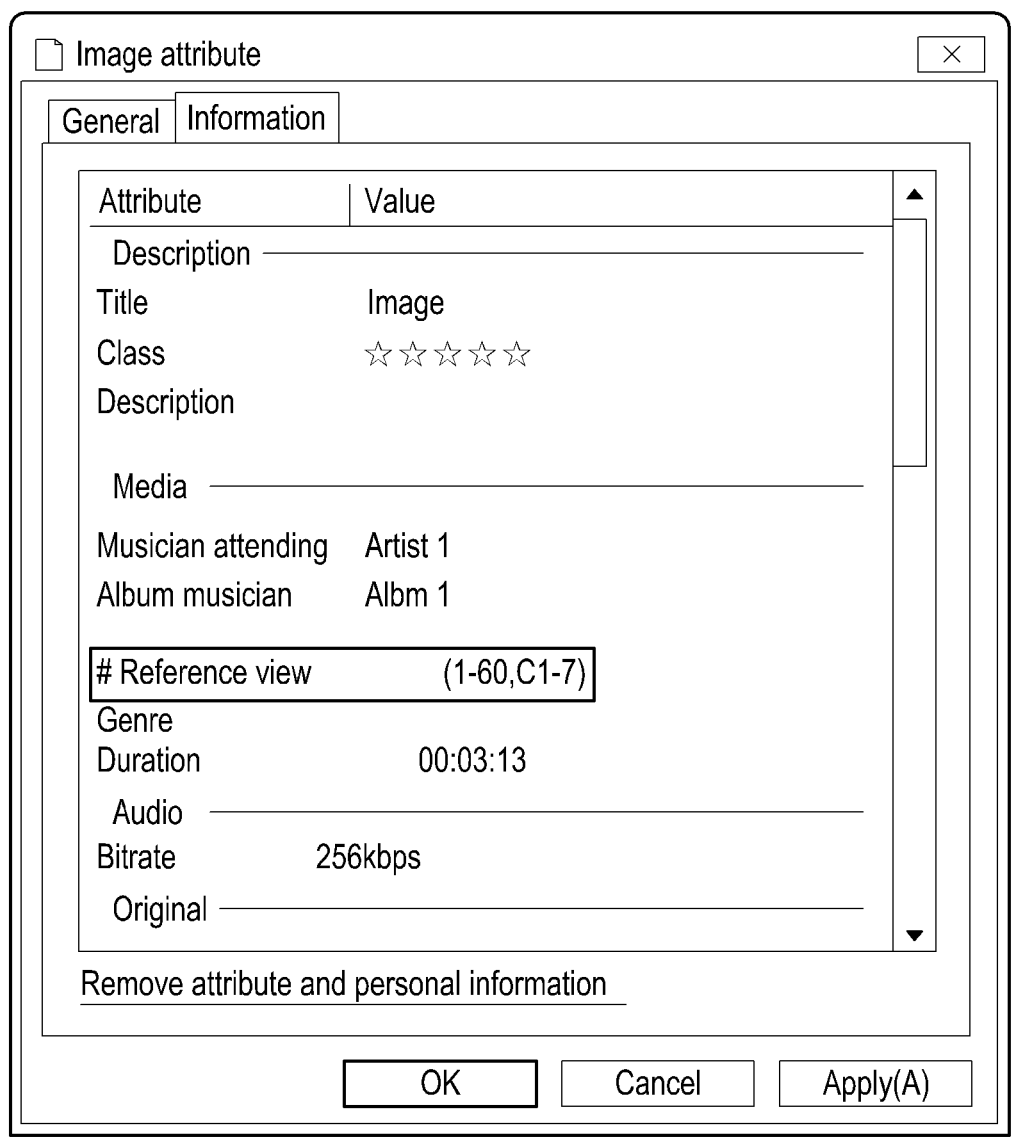
FIG. 17 is a diagram illustrating an example screen displaying reference view information according to an example embodiment of the present disclosure.

FIG. 17 is a diagram illustrating an example screen displaying reference view information according to an example embodiment of the present disclosure.

According to an example embodiment of the present disclosure, the electronic device 1000 may insert generated reference view information into information related to a panoramic image, e.g., metadata of the panoramic image. Accordingly, the user may identify the reference view information through the screen displaying the information related to the panoramic image, e.g., the metadata of the panoramic image, as illustrated so in FIG. 17. The reference view information may be represented in various fashions. The reference view information may be displayed in association with the time of obtaining the reference view information or in association with the overall time when the reference view has been set. However, this is provided merely for description purposes, and example embodiments of the present disclosure are not limited thereto. For example, the metadata may be displayed on the screen in various manners depending on methods for setting reference view information.

Figure 18:
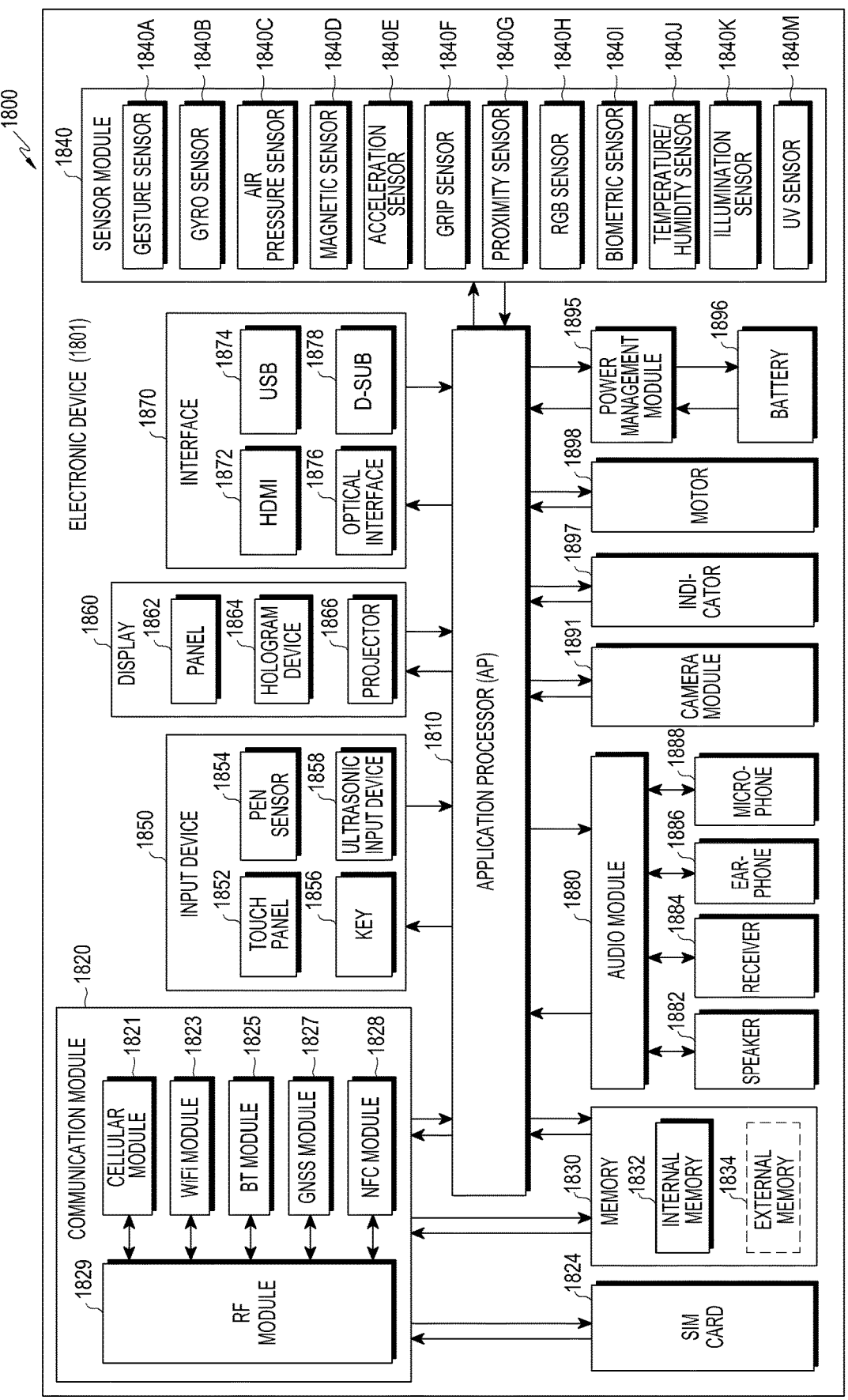
FIG. 18 is a block diagram illustrating an example electronic device according to an example embodiment of the present disclosure.

FIG. 18 is a block diagram illustrating an example electronic device 1801 according to an example embodiment of the present disclosure. The electronic device 1801 may include the whole or part of the configuration of, e.g., the electronic device 101 illustrated in FIG. 1. The electronic device 1801 may include one or more processors (e.g., application processors (APs)) (e.g., including processing circuitry) 1810, a communication module (e.g., including communication circuitry) 1820, a subscriber identification module (SIM) 1824, a memory 1830, a sensor module 1840, an input device (e.g., including input circuitry) 1850, a display 1860, an interface (e.g., including interface circuitry) 1870, an audio module 1880, a camera module 1891, a power management module 1895, a battery 1896, an indicator 1897, and a motor 1898.

The processor 1810 may include various processing circuitry configured to control multiple hardware and software components connected to the processor 1810 by running, e.g., an operating system or application programs, and the processor 210 may process and compute various data. The processor 1810 may be implemented in, e.g., a system on chip (SoC). According to an example embodiment of the present disclosure, the processor 1810 may further include a graphic processing unit (GPU) and/or an image signal processor. The processor 1810 may include at least some (e.g., the cellular module 1821) of the components illustrated in FIG. 18. The processor 1810 may load a command or data received from at least one of other components (e.g., a non-volatile memory) on a volatile memory, process the command or data, and store various data in the non-volatile memory.

The communication module 1820 may have the same or similar configuration to the communication interface 112 of FIG. 1. The communication module 1820 may include various communication circuitry, such as, for example, and without limitation, a cellular module 1821, a wireless fidelity (Wi-Fi) module 1823, a Bluetooth (BT) module 1825, a GNSS module 1827, a NFC module 1828, and a RF module 1829.

The cellular module 1821 may provide voice call, video call, text, or Internet services through, e.g., a communication network. The cellular module 1821 may perform identification or authentication on the electronic device 1801 in the communication network using a subscriber identification module 1824 (e.g., the SIM card). According to an embodiment of the present disclosure, the cellular module 1821 may perform at least some of the functions providable by the processor 1810. According to an embodiment of the present disclosure, the cellular module 1821 may include a communication processor (CP).

The Wi-Fi module 1823, the Bluetooth module 1825, the GNSS module 1827, or the NFC module 1828 may include a process for, e.g., processing data communicated through the module. According to an example embodiment of the present disclosure, at least some (e.g., two or more) of the cellular module 1821, the Wi-Fi module 1823, the Bluetooth module 1825, the GNSS module 1827, or the NFC module 1828 may be included in a single integrated circuit (IC) or an IC package.

The RF module 1829 may communicate data, e.g., communication signals (e.g., RF signals). The RF module 1829 may include, e.g., a transceiver, a power amp module (PAM), a frequency filter, a low noise amplifier (LNA), or an antenna. According to an embodiment of the present disclosure, at least one of the cellular module 1821, the Wi-Fi module 1823, the Bluetooth module 1825, the GNSS module 1827, or the NFC module 1828 may communicate RF signals through a separate RF module.

The subscriber identification module 1824 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 1830 (e.g., the memory 130) may include, e.g., an internal memory 1832 and/or an external memory 1834. The internal memory 1832 may include at least one of, e.g., a volatile memory (e.g., a dynamic random access memory (DRAM), a static RAM (SRAM), a synchronous dynamic RAM (SDRAM), etc.) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 1834 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 1834 may be functionally and/or physically connected with the electronic device 1801 via various interfaces.

For example, the sensor module 1840 may measure a physical quantity or detect an motion state of the electronic device 1801, and the sensor module 240 may convert the measured or detected information into an electrical signal. The sensor module 1840 may include at least one of, e.g., a gesture sensor 1840A, a gyro sensor 1840B, an air pressure sensor 1840C, a magnetic sensor 1840D, an acceleration sensor 1840E, a grip sensor 1840F, a proximity sensor 1840G, a color sensor 1840H such as an red-green-blue (RGB) sensor, a biometric sensor 1840I, a temperature/humidity sensor 1840J, an illumination sensor 1840K, or an ultra violet (UV) sensor 1840M. Additionally or alternatively, the sensing module 1840 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 1840 may further include a control circuit for controlling at least one or more of the sensors included in the sensing module. According to an embodiment of the present disclosure, the electronic device 1801 may further include a processor configured to control the sensor module 1840 as part of the processor 1810 or separately from the processor 1810, and the electronic device 1801 may control the sensor module 1840 while the processor 1810 is in a sleep mode.

The input unit 1850 may include various input circuitry, such as, for example, and without limitation, a touch panel 1852, a (digital) pen sensor 1854, a key 1856, or an ultrasonic input device 1858. The touch panel 1852 may use at least one of capacitive, resistive, infrared, or ultrasonic methods. The touch panel 1852 may further include a control circuit. The touch panel 1852 may further include a tactile layer and may provide a user with a tactile reaction.

The (digital) pen sensor 1854 may include, e.g., a part of a touch panel or a separate sheet for recognition. The key 1856 may include e.g., a physical button, optical key or key pad. The ultrasonic input device 1858 may sense an ultrasonic wave generated from an input tool through a microphone to identify data corresponding to the sensed ultrasonic wave.

The display 1860 may include a panel 1862, a hologram device 1864, or a projector 1866. The panel 1862 may be implemented to be flexible, transparent, or wearable. The panel 1862 may also be incorporated with the touch panel 1852 in a module. The hologram device 1864 may make three dimensional (3D) images (holograms) in the air by using light interference. The projector 1866 may display an image by projecting light onto a screen. The screen may be, for example, located inside or outside of the electronic device 1801. In accordance with an embodiment, the display 1860 may further include a control circuit to control the panel 1862, the hologram device 1864, or the projector 1866.

The interface 1870 may include various interface circuitry, such as, for example, and without limitation, a high definition multimedia interface (HDMI) 1872, a USB 1874, an optical interface 1876, or a D-subminiature (D-sub) 1878. Additionally or alternatively, the interface 1870 may include a mobile high-definition link (MHL) interface, a secure digital (SD) card/multimedia card (MMC) interface, or infrared data association (IrDA) standard interface.

The audio module 1880 may converting, e.g., a sound signal into an electrical signal and vice versa. At least a part of the audio module 1880 may be included in e.g., the input/output interface. The audio module 1880 may process sound information input or output through e.g., a speaker 1882, a receiver 1884, an earphone 1886, or a microphone 1888.

For example, the camera module 1891 may be a device for recording still images and videos, and may include, according to an embodiment of the present disclosure, one or more image sensors (e.g., front and back sensors), a lens, an Image signal processor (ISP), or a flash such as an LED or xenon lamp.

The power manager module 1895 may manage power of the electronic device 1801, for example. According to an embodiment of the present disclosure, the power manager module 1895 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 1896, a voltage, a current, or a temperature while the battery 296 is being charged. The battery 1896 may include, e.g., a rechargeable battery or a solar battery.

The indicator 1897 may indicate a particular state of the electronic device 1801 or a part (e.g., the processor 1810) of the electronic device, including e.g., a booting state, a message state, or recharging state. The motor 1898 may convert an electric signal to a mechanical vibration and may generate a vibrational or haptic effect. Although not shown, a processing unit for supporting mobile TV, such as a GPU may be included in the electronic device 1801. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various example embodiments of the present disclosure may include at lest one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of processing circuitry, a dedicated processor, Application Specific Integrated Circuit (ASIC) chips, Field Programmable Gate Arrays (FPGAs), or Programmable Logic Arrays (PLAs) that perform some operations, which have already been known or will be developed in the future.

According to an example embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various example embodiments of the present disclosure may include at least one or more of the aforementioned components, omit some of them, or further include other additional components. Operations performed by modules, programming modules or other components in accordance with various example embodiments of the present disclosure may be carried out sequentially, simultaneously, repeatedly, or heuristically. Furthermore, some of the operations may be performed in a different order, or omitted, or include other additional operation(s).

According to an example embodiment of the present disclosure, there is provided a storage medium retaining commands executed by at least one processor to enable the at least one processor to perform at least one operation that may include identifying a direction where a user views through a sensor, displaying a first partial image of a panoramic image corresponding to the identified direction of view, when information regarding the first partial image differs from reference view information indicating a reference view for the panoramic image, determining a direction corresponding to the reference view information, and providing information about the identified direction.

The at least one operation may further comprise obtaining a plurality of images from a plurality of image capturing modules included in the electronic device and spaced apart from each other to have different optical axis directions, generating reference view information indicating a reference view for the panoramic image generated using the plurality of images, and inserting the reference view information into information related to the panoramic image.

The example embodiments disclosed herein are provided for description and understanding of the disclosed technology and do not limit the scope of the present disclosure. Accordingly, the scope of the present disclosure should be understood as including all changes or various embodiments based on the technical spirit of the present disclosure.

What is claimed is:

1. An electronic device, comprising:
a sensor;
a display; and
a processor configured to:
sense, through the sensor, a first direction of a first side surface of the electronic device,
display, on the display, a first partial image of a panoramic image corresponding to the first direction of the first side surface sensed through the sensor, and
while the first partial image of the panoramic image is displayed on the display:
compare information regarding the first partial image with reference view information included in the panoramic image, the reference view information indicating a reference view preset for a reference of the panoramic image within the panoramic image before the displaying of the first partial image,
when the information regarding the first partial image differs from the reference view information, identify a second direction from the first partial image to a second partial image of the panoramic image corresponding to the reference view based on the first direction of the first side surface of the electronic device, the first side surface having been set as a reference surface,
display information about the identified second direction on the displayed first partial image while the second partial image is not displayed on the display, wherein a distance to the reference view is indicated based on a size of the displayed information about the identified second direction, and
control the information about the identified second direction to disappear when the second partial image is displayed on the display.

2. The electronic device of claim 1, wherein the panoramic image includes a left-eye panoramic image and a right-eye panoramic image for providing a virtual reality (VR) service.

3. The electronic device of claim 1, wherein the processor is further configured to amplify first voice information associated with the first partial image and to attenuate voice information associated with a remaining portion of the panoramic image other than the first partial image.

4. The electronic device of claim 1, wherein the information regarding the first partial image includes at least one of: coordinate information regarding the first partial image, information about at least one image capturing module comprising image capturing circuitry for obtaining an image containing the first partial image, and direction information regarding the first partial image.

5. The electronic device of claim 1, wherein the reference view information is generated each time a plurality of images used to generate the panoramic image obtained and is inserted into information related to the panoramic image associated with the times of obtaining the plurality of images.

6. The electronic device of claim 1, wherein the processor is further configured to control the display to display on the display a graphical object indicating the information about the identified second direction on a preset area of the first partial image.

7. The electronic device of claim 1, wherein the processor is further configured to output a voice indicating the information about the identified second direction.

8. The electronic device of claim 1, wherein the processor is further configured to output a vibration based on the information about the identified second direction.

9. The electronic device of claim 1, wherein the processor is further configured to control the display to switch the first partial image to the second partial image of the panoramic image corresponding to the reference view information.

10. The electronic device of claim 9, wherein the processor is further configured to attenuate first voice information associated with the first partial image and to amplify second voice information associated with the second partial image.

11. A method for displaying a panoramic image by an electronic device, the method comprising:
sensing a first direction of a first side surface of the electronic device through a sensor included in the electronic device;
displaying, on a display of the electronic device, a first partial image of the panoramic image corresponding to the sensed first direction of the first side surface; and
while the first partial image of the panoramic image is displayed on the display:
comparing information regarding the first partial image with reference view information included in the panoramic image, the reference view information indicating a reference view preset for a reference of the panoramic image within the panoramic image before the displaying of the first partial image,
when the information regarding the first partial image differs from the reference view information, identifying a second direction from the first partial image to a second partial image of the panoramic image corresponding to the reference view based on the first direction of the first side surface of the electronic device, the first side surface having been set as a reference surface,
displaying information about the identified second direction on the displayed first partial image while the second partial image is not displayed on the display, wherein a distance to the reference view is indicated based on a size of the displayed information about the identified second direction, and
controlling the information about the identified second direction to disappear when the second partial image is displayed on the display.

12. The method of claim 11, wherein the panoramic image includes a left-eye panoramic image and a right-eye panoramic image for providing a virtual reality (VR) service.

13. The method of claim 11, wherein displaying the first partial image includes amplifying first voice information associated with the first partial image and attenuating voice information associated with a remaining portion of the panoramic image other than the first partial image.

14. The method of claim 11, wherein the information regarding the first partial image includes at least one of coordinate information regarding the first partial image, information about at least one image capturing module obtaining an image containing the first partial image, and direction information regarding the first partial image.

15. The method of claim 11, wherein the reference view information is generated each time a plurality of images used to generate the panoramic image is obtained and is inserted into information related to the panoramic image in association with the times of obtaining the plurality of images.

16. The method of claim 11, wherein displaying the information about the identified second direction includes displaying a graphical object indicating the information about the identified second direction on a preset area of the first partial image.

17. The method of claim 11, further comprising:
outputting a voice indicating the information about the identified second direction.

18. The method of claim 11, further comprising:
outputting a vibration based on the information about the identified second direction.

19. The method of claim 11, further comprising:
switching the first partial image to the second partial image of the panoramic image corresponding to the reference view information and displaying the second partial image;
attenuating first voice information associated with the first partial image; and
amplifying second voice information associated with the second partial image.

20. A non-transitory computer-readable recording medium having stored thereon a program to be executed on a computer, wherein the program comprises commands which, when executed by a processor, cause the processor to perform operations comprising:
displaying, on a display included in an electronic device, a first partial image of a panoramic image corresponding to a first direction of a first side surface of the electronic device sensed through a sensor included in the electronic device; and
while the first partial image of the panoramic image is displayed on the display:
comparing information regarding the first partial image with reference view information included in the panoramic image, the reference view information indicating a reference view preset for a reference of the panoramic image within the panoramic image before the displaying of the first partial image,
when the information regarding the first partial image differs from the reference view information, identifying a second direction from the first partial image to a second partial image of the panoramic image corresponding to the reference view based on the first direction of the first side surface of the electronic device, the first side surface having been set as a reference surface,
displaying information about the identified direction on the displayed first partial image while the second partial image is not displayed on the display, wherein a distance to the reference view is indicated based on a size of the displayed information about the identified second direction, and
controlling the information about the identified second direction to disappear when the second partial image is displayed on the display.

* * * * *